United States Patent [19]

Nilsson

[11] Patent Number: 5,177,764
[45] Date of Patent: Jan. 5, 1993

[54] UNIDIRECTIONAL, PLANAR RING LASER WITH BIREFRINGENCE

[75] Inventor: Alan C. Nilsson, Mountain View, Calif.

[73] Assignee: Harmonic Lightwaves, Inc., Santa Clara, Calif.

[21] Appl. No.: 462,732

[22] Filed: Jan. 9, 1990

Related U.S. Application Data

[63] Continuation-in-part of Ser. No. 458,174, Dec. 28, 1989, abandoned.

[51] Int. Cl.⁵ .................................... H01S 3/083
[52] U.S. Cl. .................................... 372/94; 372/105; 372/66; 372/27; 372/20
[58] Field of Search ............... 372/94, 66, 105, 27, 372/37, 92, 20

[56] References Cited

U.S. PATENT DOCUMENTS

| | | |
|---|---|---|
| 4,578,793 | 3/1986 | Kane et al. |
| 4,653,056 | 3/1987 | Baer et al. ............... 372/27 |
| 4,734,912 | 3/1988 | Scerbak et al. ............ 372/105 |
| 4,747,111 | 5/1988 | Trutna et al. |
| 4,764,933 | 8/1988 | Kozlovsky |
| 4,797,896 | 1/1989 | Kane ................... 372/94 |
| 4,955,034 | 9/1990 | Scerbal ................. 372/94 |
| 5,007,065 | 4/1991 | Trutna, Jr. .............. 372/66 |
| 5,027,367 | 6/1991 | Rea, Jr. et al. ........... 372/94 |
| 5,043,996 | 8/1991 | Nilsson et al. ............ 372/94 |
| 5,052,815 | 10/1991 | Nightingale et al. |

Primary Examiner—Léon Scott, Jr.
Attorney, Agent, or Firm—Steven F. Caserza

[57] ABSTRACT

The present invention provides a means of inducing unidirectional oscillation in monolithic and composite ring lasers in which the light path is planar. The intracavity optical diode that enforces unidirectional oscillation in the planar ring oscillator is achieved by a combination of the nonreciprocal Faraday effect, a linear birefringence effect in which the principal axes of the birefringence are not parallel and perpendicular to the plane of propagation of the ring light path, and one or more partial polarizer effects. The present invention enables experimental optimization of polarization transformations within a planar ring oscillator, even if the oscillator is monolithic, and also provides a means of tuning the frequency of the planar ring oscillator. Applications of the present invention involving monolithic resonators, composite resonators in which the ring light path is entirely contained within solid-state media, and composite resonators in which the ring light path involves propagation across one or more gaps between physically separated solid-state elements are also taught. The present invention provides an attractive alternative to the use of nonplanar ring light path geometry in both monolithic and composite resonator structures in which unidirectional oscillation is desired. The present invention makes it possible to vary both the reciprocal and non-reciprocal polarization transformations used to produce unidirectional oscillation. Such eigenpolarization-tunability is particularly advantageous in monolithic planar ring oscillators.

30 Claims, 29 Drawing Sheets

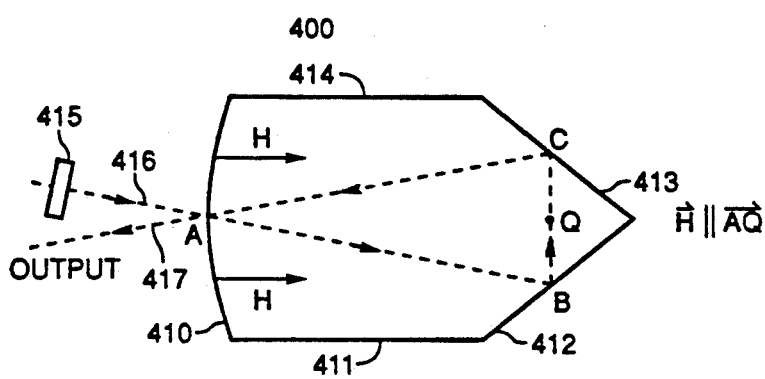
*FIGURE 4A*
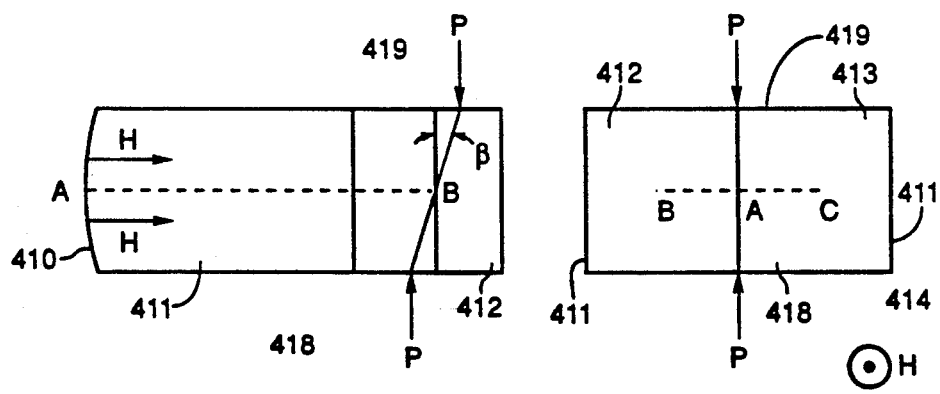
*FIGURE 4B*  *FIGURE 4C*

(A) STANDARD INTERFACE (B) BREWSTER INTERFACE (C) NORMAL INTERFACE

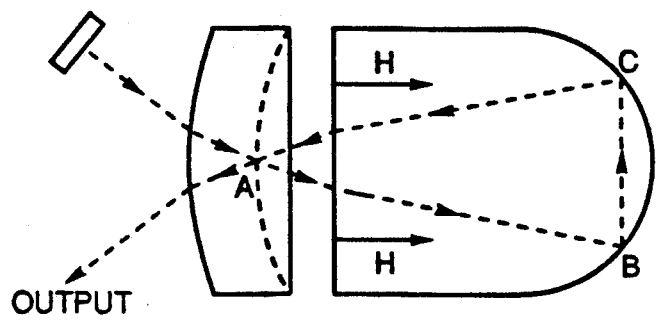
*FIGURE 19A*
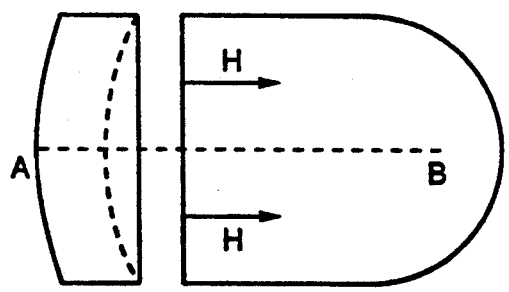 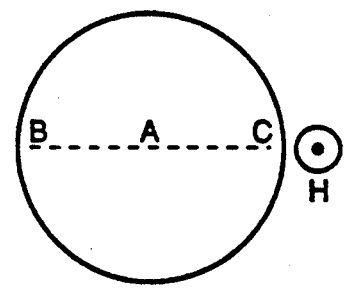
*FIGURE 19B*          *FIGURE 19C*

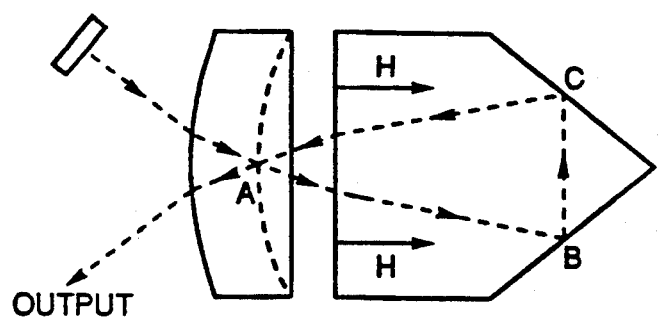
FIGURE 20A
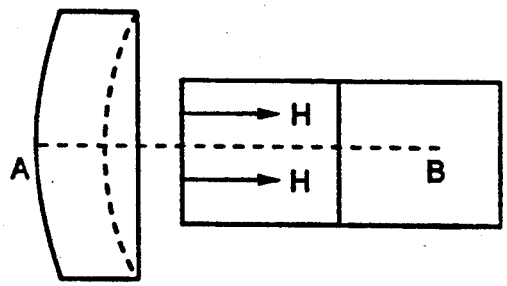 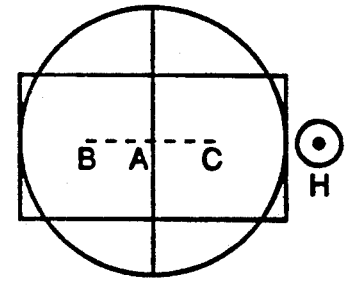
FIGURE 20B  FIGURE 20C 5,177,764

UNIDIRECTIONAL, PLANAR RING LASER WITH BIREFRINGENCE

INTRODUCTION

This application is a continuation-in-part of U.S. patent application Ser. No. 4,581,74 , now abandoned, filed Dec. 28, 1989, on an invention of Alan C. Nilsson and Robert L. Byer, entitled "Unidirectional, Monolithic Planar Ring Laser With Birefringence".

FIELD OF THE INVENTION

The present invention relates to solid-state ring lasers that are longitudinally pumped by one or more laser pump sources. More specifically, the present invention relates to longitudinally-pumped solid-state ring lasers in which unidirectional oscillation can be achieved. The present invention provides a means of achieving unidirectional oscillation in a monolithic or composite resonator in which the light path is planar. The present invention also provides a means of tuning the frequency of the unidirectional ring laser.

DEFINITIONS

Ring light path: a closed polygonal path defined by the central ray of a beam of light. If all of the legs of the polygon lie within a single plane, the ring light path is planar. If the legs of the polygon do not all lie within a single plane, the ring light path is nonplanar.

Ring laser: a laser in which the light path internal to the laser resonator is a ring light path.

Monolithic ring laser: a laser in which the resonator is made from a single piece of solid-state laser material, shaped such that laser oscillation occurs along an internal ring light path. The solid-state laser material may have one or more optical coatings applied to its external surfaces.

Composite ring laser: a solid-state ring laser that is not monolithic, i.e., the ring resonator contains at least two solid-state components. If the two or more solid-state components are all joined in such a way that the internal ring light path is entirely contained within solid-state media, the composite ring laser resonator is said to have a closed architecture. If the internal ring light path involves propagation across one or more gaps between solid-state components, the resonator is said to have an open architecture.

Birefringence: a lossless optical medium exhibiting optical phase anisotropy for propagation in a certain direction within the medium is said to have pure birefringence. The birefringence associated with propagation in a certain direction through an optically anisotropic medium is classified as elliptical, circular, or linear according to the eigenstates of polarization for propagation in that direction. The most general pure birefringence is elliptical, which means that the eigenstates of polarization are orthogonal, elliptical states of polarization. Two special cases of elliptical birefringence are circular and linear birefringence. The eigenstates of polarization for circular birefringence are right and left circular polarization states. The eigenstates of polarization for linear birefringence are orthogonal, linearly polarized states. Birefringence can be intrinsic to an optical medium, or it may be induced in a medium by the action of some external influence such as a magnetic field, an electric field, or an applied stress.

Magneto-optic effects: polarization influencing effects that depend on the presence of a magnetic field within a medium. The magneto-optic polarization effects of interest here include effects associated with magnetic circular birefringence (Faraday rotation), and effects associated with reflection from magnetic materials (magnetic Kerr effects). Magnetic circular birefringence can be intrinsic to a material or may be induced in an initially optically isotropic medium (an amorphous material such as glass, or a cubic crystal such as YAG) by application of a magnetic field. Magnetic Kerr effects of interest include the polar Kerr effect, which is the reflection analog of Faraday rotation, and the transverse Kerr effect, for which the eigenstates of polarization are linear polarization states parallel and perpendicular to the plane of incidence. Note: The polarization effects associated with the simultaneous presence of a linear birefringence and magnetic circular birefringence in a medium are treated within the text of this application.

Partial polarizer: an optical component that exhibits pure amplitude anisotropy for its eigenstates. Again, the classification of partial polarizers proceeds according to their eigenstates. Thus, an elliptical partial polarizer has as its eigenstates two orthogonal, elliptical states of polarization that suffer different attenuations in the interaction with the elliptical partial polarizer. A circular partial polarizer is a special case of an elliptical partial polarizer having circular polarization states as its eigenpolarizations. A linear partial polarizer has orthogonal, linear polarization eigenstates that suffer different attenuations in the interaction with the linear partial polarizer. A common realization of a linear partial polarizer, particularly relevant for ring lasers, is oblique reflection from or transmission through an interface between different optically isotropic media.

Reciprocal polarization transformation: a polarization influence (in a fixed system) that does not rely on a magnetic field to produce the effect is said to induce a reciprocal polarization transformation. Examples of reciprocal polarization transformations include optical activity, propagation in media exhibiting birefringence that does not involve magneto-optic effects, and interaction with partial polarizers that do not involve magneto-optic effects.

Nonreciprocal polarization transformation: a polarization influence (in a fixed system) that involves a magnetic field to produce the effect. Examples of nonreciprocal polarization transformations include Faraday rotation (magnetic circular birefringence) and other magneto-optic effects.

(Intracavity) optical diode: an optical system that has different minimal attenuations for the two directions of a propagation through it is called an optical diode. For use internal to a ring laser cavity, an optical diode is created by a proper combination of three effects: a reciprocal polarization transformation, a nonreciprocal polarization transformation, and a partial polarizer.

Unidirectional ring laser: a ring laser in which a biasing influence is used to cause the laser to oscillate in only one of the two possible directions of propagation around the ring. For the purpose of discussion here, the biasing influence is taken to be an intracavity optical diode. The laser will oscillate in the direction of the intracavity optical diode having the smaller minimal attenuation.

DESCRIPTION OF THE PRIOR ART

The prior art has presented the advantages of longitudinal-pumping of solid-state lasers. Longitudinal pumping of rare-earth-doped glasses and crystals by ion lasers, dye lasers, and diode lasers has been described in Fan et al., "Diode laser-pumped solid-state lasers," IEEE J. Quantum Electron., QE-24, 895-912 (1988); Kozlovsky et al., "Diode-pumped continuous-wave Nd:glass laser," Opt. Lett. 11, 788-790 (1986); Xing et al., "Thermal shifts of the spectral lines in the $^4F_{3/2}$ to $^4I_{11/2}$ manifold of an Nd:YAG laser," IEEE J. Quantum Electron., QE-24, 1829-1832 (1988); and Rea, Jr. et al., "Single Frequency, Unidirectional, Monolithic Nd: glass nonplanar ring laser," Conference on Lasers and Electro-optics, 1989 Technical Digest Series, vol. 11 (Optical Society of America, Washington, D.C. 1989) paper WH4, pp. 222-225. Argon-ion laser pumping of Ti:sapphire has also been discussed in Alfrey, "Modeling of longitudinally pumped CW Ti:sapphire laser oscillators," IEEE J. Quantum Electron., QE-25, 760-766 (1989). Particularly when the pump source is a properly selected semiconductor diode laser or diode laser array, longitudinal pumping of solid-state lasers is efficient and can yield narrow linewidth operation of the solid-state laser. See Zhou et al., "Efficient, frequency-stable diode laser-pumped Nd:YAG laser," Opt. Lett. 10, 62-64 (1985) and Kane, Nilsson, and Byer, "Frequency stability and offset locking of a laser-diode-pumped Nd:YAG monolithic nonplanar ring oscillator," Opt. Lett., 12:175-177 (1987).

The advantages of unidirectional ring lasers for overcoming spatial hole burning and permitting single-frequency operation at high output power levels in homogeneously broadened laser media have long been laser," Appl. Phys. Lett., 21:265-267 (1972). Recent publications such as T. J. Kane and R. L. Byer, "Monolithic unidirectional single-mode Nd:YAG ring laser," Opt. Lett., 10:65-67 (1985), Kane, Nilsson, and (cited above) W. R. Trutna, Jr., D. K. Donald and M. Nazarathy, "Unidirectional diode-laser-pumped NdLYAG ring laser with a small magnetic field, " Opt. Lett., 12:248-250 (1987), Nilsson, Gustafson, and Byer, "Eigenpolarization theory of monolithic nonplanar ring oscillators," IEEE J. Quantum Electron. 25, 767-790 (1989); and Rea, Jr. et al. have presented the advantages of diode-laser-pumped monolithic nonplanar ring oscillators made from rare-earth-doped garnet crystals and rare-earth-doped laser glasses with regard to efficiency, single-mode operation, frequency stability, output power, and resistance to the deleterious effects of optical feedback. These publications describe the means for achieving unidirectional oscillation in monolithic nonplanar ring oscillators, but contain no mention of unidirectional, planar ring oscillators. Recent product literature from Elecro-optics Technology, Inc. shows a monolithic, unidirectional planar ring laser but provides no description of the means of inducing unidirectional oscillation.

Trutna, Jr. et al. emphasize the advantages of monolithic nonplanar ring oscillators made from Nd:YAG for applications involving the 1.3 μm wavelength region of interest for fiber-optic communications and sensors. One potential difficulty in the devices of Trutna, Jr. et al. is that simultaneous operation at 1319 nm and 1338 nm occurred.

Accordingly, it is desirable to provide a means for eliminating multiple-wavelength operation of a laser for applications in which true, single-wavelength output is required or desirable.

SUMMARY OF THE INVENTION

The present invention provides a means of inducing unidirectional oscillation in monolithic and composite ring lasers in which the light path is planar. The intracavity optical diode that enforces unidirectional oscillation in the planar ring oscillator is achieved by a combination of the nonreciprocal Faraday effect, a linear birefringence effect in which the principal axes of the birefringence are not parallel and perpendicular to the plane of propagation of the ring light path, and one or more partial polarizer effects. The present invention enables experimental optimization of polarization transformations within a planar ring oscillator, even if the oscillator is monolithic, and also provides a means of tuning the frequency of the planar ring oscillator. Applications of the present invention involving monolithic resonators, composite resonators in which the ring light path is entirely contained within solid-state media, and composite resonators in which the ring light path involves propagation across one or more gaps between physically separated solid-state elements are also taught.

The present invention provides an attractive alternative to the use of nonplanar ring light path geometry in both monolithic and composite resonator structures in which unidirectional oscillation is desired. The present invention makes it possible to vary both the reciprocal and nonreciprocal polarization transformations used to produce unidirectional oscillation. Such eigenpolarization-tunability is particularly advantageous in monolithic planar ring oscillators. In contrast, the reciprocal polarization transformations used to establish unidirectional oscillation in monolithic nonplanar ring oscillators of the prior art are fixed by the choice of the resonator geometry and laser medium.

Other advantages of the present invention pertaining to frequency tunability and optimization of unidirectional oscillation will be presented in connection with preferred embodiments below.

BRIEF DESCRIPTION OF THE DRAWINGS

FIGS. 4(a)-4(c) show an alternative embodiment of a three-reflection, monolithic planar ring oscillator.

FIGS. 19(a)-19(c) are alternative embodiments of the resonator of FIG. 18, in which cylindrical symmetry has been preserved for both the external mirror and the active element.

FIGS. 20(a)-20(c) are alternative embodiments of the resonator of FIG. 18 in which the laser gain element is bounded entirely by planar surfaces.

FIGS. 21(a)14 21(c) shows three element, composite planar ring oscillator consisting of an output coupling mirror from the laser elements. The two laser element pieces are in contact with one another and are simply mirror images of one another. The ring laser light path is perpendicular to the interface between the two laser element pieces and also to the interface between the laser element pieces and the air gap.

FIGS. 28(a)-28(c) show the optical systems that are equivalent in their eigenpolarization characteristics to any planar ring oscillator in which the ring light path has a plane of mirror symmetry as illustrated in FIG. 26 and in which the amplitude anisotropy (partial polarizer behavior) occurs at reflection Vertex A.

FIGS. 29(a)-29(c) show a mirror symmetric, three-reflection planar ring light path in which the Jones matrices corresponding to the polarization transformations or counterclockwise propagation are indicated.

TABLE OF CONTENTS

Figure 1A:
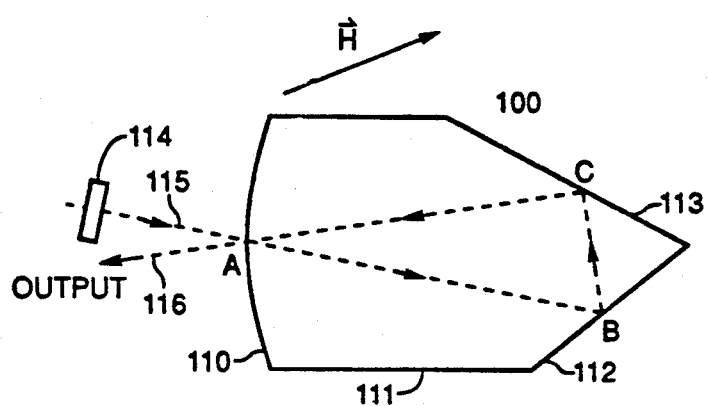
FIGS. 1(a)-1(c) show a general, asymmetric, three-reflection, monolithic planar ring oscillator of the present invention.

1. Principles of Operation
   1.1 Optical Diode
   1.2 Reciprocal Polarization Transformations in Optical Diodes
   1.3 Birefringence
   1.4 Simultaneous, Distributed Reciprocal and Nonreciprocal Polarization Transformations
   1.5 Frequency Tuning
   1.6 Pumping
   1.7 Advantages of the Invention for Monolithic Ring Lasers
2. Monolithic Unidirectional Planar Ring Oscillators
   2.1 Monolithic Three-Reflection Planar Ring Oscillators
      2.1.1 General, Asymmetric Case
      2.1.2 Symmetric, Faceted Rod
      2.1.3 Cylindrically Symmetric Rod
      2.1.4 Prism
      2.1.5 Electro-Optic Version
      2.1.6 Multiple Actuators
      2.1.7 Multiport Pumping
   2.2 Monolithic Unidirectional Planar Ring Oscillators Defined By Four or More Reflections
      2.2.1 Symmetric, Four-Reflection, Faceted Rod
      2.2.2 Symmetric, Five-Reflection, Faceted Rod
3. Composite Planar Ring Resonators
   3.1 Closed Architecture Resonators
      3.1.1 Interfaces Between Two Solid-State Components
      3.1.2 General Three-Reflection Ring with a Standard Interface
      3.1.3 Alternate Resonator Geometries for Three-Reflection Rings
      3.1.4 Special Five-Reflection Embodiments
   3.2 Open Architecture Resonators
      3.2.1 Tuning advantages
   2 3.2.2 Resonators with a Simple External Mirror
      3.2.3 Resonators with Multiple, Active Elements
4. Appendix A: Geometries of Light Paths
   4.1 Total Internal Reflection (TIR) at B and C, No TIR at A
   4.2 Multiport Pumping at A, B, and C: No TIRs
5. Appendix B: Eigenpolarization Analysis
   5.1 Optical Equivalence Theorem
   5.2 Synthesis of an Optimized Optical Diode

DETAILED DESCRIPTION

1. Principles of Operation

1.1 Optical Diode

Unidirectional oscillation in a ring laser occurs when there is a sufficiently large difference between the net round trip gains for the two possible directions of propagation around the ring. Unidirectional oscillation is often achieved by using combinations of polarization transformations that depend on the direction of propagation to create an effective optical diode: a device that causes different directions of propagation to have eigenpolarizations with different losses. Recall that for each of the two directions of propagation around a ring laser there are two possible eigenpolarizations (see, for example, Statz et al., "The Multioscillator Ring Laser Gyroscope," in Laser Handbook, vol. 4, M. L. Stitch and M. Bass, eds., North-Holland, Amsterdam, the Netherlands, 1985). In general, the eigenpolarizations corresponding to a given direction of propagation have different round trip losses. For a homogeneously broadened gain medium, we need only consider the low-loss eigenpolarization for each direction of propagation. If the low-loss eigenpolarizations for the two directions of propagation have sufficiently different round trip losses, then the laser will oscillate in the direction corresponding to the lowest loss eigenpolarization. These arguments are more fully developed in, for example, Nilsson, Gustafson, and Byer.

Discrete-element optical diodes for dye ring lasers are described by Johnston, Jr. et al., "Design and performance of a broad-band optical diode to enforce one-direction traveling-wave operation of a ring laser," IEEE J. Quantum Electron, QE-16, 483–488 (1980) and optimization of discrete-element optical diodes for use in Nd:YAG ring lasers is discussed by Kruzhalov, Parfenov, Pakhomov, and Petrun'kin, "Optical Isolators in YAG:Nd laser cavities," *Sov. Phys. Tech. Phys.*, 30:1145–1147(1985). From the analysis of discrete-element optical diodes and the analysis of monolithic nonplanar ring lasers, we arrive at a crucial conclusion about the minimal requirements for creating an intracavity optical diode. Fundamentally, the operation of an optical diode requires a combination of three effects: 1) nonreciprocal polarization transformations such as Faraday rotation, 2) reciprocal polarization transformations (induced, for example, by using linear retarders or optically active media), and 3) a partial polarizer.

1.2 Reciprocal Polarization Transformations in Optical Diodes

Discrete element optical diodes typically use Faraday rotation for the nonreciprocal polarization rotated half-wave linear retarder for the reciprocal polarization transformation. In cases involving only optical activity and Faraday rotation, the net polarization transformation resulting from optical activity and Faraday rotation is a simple rotation of the polarization state, and the magnitude of the rotation depends on the direction of propagation. For example, the Faraday rotation and the rotation due to optical activity can be made equal in magnitude. Then for one direction of propagation, the two rotations exactly one direction of propagation, the two rotations exactly cancel, and for the other direction of propagation the two rotations add. A linear partial polarizer (for example, one or more Brewster-angle interfaces) in the ring cavity then makes the eigenpolarizations for the two directions of propagation have different minimal losses, enabling unidirectional oscillation. (See Johnston, Jr. et al., Kruzhalov, Parfenov, Pakhomov, and Petrun'kin; Nilsson, Gustafson, and Byer previously cited.)

J. A. Arnaud, "Degenerate Optical Cavities," Appl. Opt. 8:189–195 (1969) pointed out that a nonplanar ring cavity exhibits reciprocal polarization rotation analogous to optical activity. F. Biraben, "Efficacite des systemes unidirectionnels utilisables dan les lasers en anneau," *Opt. Commun.*, 29:353–356 (1979) proposed combining a nonplanar ring cavity, a Faraday rotator, and a linear partial polarizer to produce unidirectional oscillation of a ring dye laser. Kane and Byer showed that the use of a nonplanar ring resonator could enable unidirectional oscillation in monolithic solid state laser.

Accordingly, in monolithic solid-state ring lasers of the prior art, the intracavity optical diode that enables unidirectional operation has comprised a combination of Faraday rotation, reciprocal polarization transformations induced by the nonplanar ring geometry of the light path and the phase changes induced at reflections, and a linear partial polarizer effect associated with reflection from a multilayer dielectric coated output coupler at oblique incidence. A complete analytical description of the eigenpolarization analysis of monolithic nonplanar ring lasers of the prior art is given by Nilsson, Gustafson, and Byer.

Nilsson, Gustafson, and Byer have proved that it is impossible to create a stable optical diode effect in monolithic ring lasers made from optically isotropic media unless two conditions are satisfied: 1) there must be an applied magnetic filed to induce Faraday rotation in the laser medium (the laser medium is assumed to have a nonzero Verdet constant), and 2) the light path must be nonplanar. The applied magnetic field is required to produce the nonreciprocal polarization transformation part of the optical diode; the nonplanar ring light path produces the reciprocal polarization transformation.

Note that the above discussion excludes the possibility of using one or more magneto-optic mirrors to achieve the nonreciprocal polarization transformation. We consider the use of magneto-optic mirrors in connection with certain embodiments of the invention to be described later.

The invention described here presents a novel means of creating an optical diode in monolithic or composite ring lasers. The novel technique of this invention is distinguished from the prior art by two essential features: 1) the ring light path is planar, and 2) the light path contains a linear birefringence effect, the principal axes of which are rotated with respect to at least one set of the traveling s and p linear polarization basis vectors associated with propagation along each leg of the planar ring light path. Note: in analyzing the propagation of light in a ring laser it is convenient to introduce traveling coordinate systems in which the local direction of propagation along a leg of the ring light path is always taken to be the positive z direction. The unit basis vectors transverse to the direction of propagation are the unit vector perpendicular to the plane of propagation, denoted by s, and a unit vector in the plane propagation, denoted by p, defined such that $p \times s = z$.

The rotated linear birefringence effect is used to create a reciprocal polarization transformation analogous to that caused by the nonplanar ring light path of the prior art. In concert with the Faraday rotation and linear partial polarizer effects common to both the prior art and the current invention, an optical diode is created within the planar ring light path that causes a difference in the round trip losses for the two directions of propagation. Unidirectional oscillation is thereby possible, facilitating single-frequency operation even at high output powers, and improving resistance to the destabilizing influence of optical feedback. (See, Nilsson, Kane and Byer, "Monolithic Nonplanar Ring Lasers: Resistance To Optical Feedback," in *Pulsed Single-Frequency*

*Lasers: Technology and Applications* (1988) SPIE Vol. 912.

1.3 Birefringence

The important new element of this invention is the use of a rotated, linear birefringence effect to produce reciprocal polarization transformations analogous to those caused by nonplanar geometry in the prior monolithic ring laser art. The many possible ways to implement the effect in accordance the teachings of this invention may be grouped into two categories: 1) induced linear birefringence, and 2) natural linear birefringence. Of these two categories, the examples of this invention described herein emphasize the use of induced linear birefringence, particularly for monolithic planar ring oscillators, for reasons that are explained below.

Induced linear birefringence refers to the use of some externally applied effect to break the initial optical isotropy of the laser medium. Examples of optically isotropic laser media include all of the crystalline laser hosts with cubic symmetry and the many laser glasses. Among the crystalline laser hosts with cubic symmetry, the most important are the garnets, especially YAG, GGG, GSGG, YSAG, YSGG. The most important means of inducing linear birefringence in initially optically isotropic media include the photoelastic effect and the linear electrooptic effect, as shown in . F. NYE, "Physical Properties of Crystals," (Oxford University Press, New York, 1986). The photoeleastic effect refers to the changes in the magnitudes of the principal indices of refraction and the directions of the corresponding principal axes that occur when stress is applied to a medium. The photoelastic effect occurs in all media, regardless of symmetry. The linear electrooptic effect is the analogous collection of changes induced in a medium when an external electric field is applied. The linear electrooptic effect occurs only for media whose point group symmetry excludes inversion.

Natural linear birefringence refers to media that exhibit optical anisotropy with linear eigenpolarization states in the absence of external influences. All crystals with non-cubic point group symmetry are characterized by natural birefringence, and most of these exhibit linear birefringence. Thus, many useful crystalline laser hosts are intrinsically birefringent, including YLF, YALO (also called YAP), YVO$_4$, AL$_2$O$_3$, Mg:F$_2$, and many others.

The polarization transformation associated with a rotated, linear-birefringent section of the light path is the same effect as occurs in a linear retarder (waveplate). It is essential that the principal axes of the birefringence effect be rotated with respect to at least one set of the s and p vectors of the propagating coordinate system. This requirement produces a reciprocal polarization transformation that can partially or fully cancel the Faraday rotation for one direction of propagation and can add to the Faraday rotation for the other direction of propagation. In this way, the rotated birefringence effect invoked here is analogous to the use of, for example, a rotated halfwave plate to cancel the Faraday rotation in a discrete-element optical diode (Clobes and Brienza, and Kruhalov, Parfenov, Pakhomov, and Petrun'kin, previously cited). The novelty of this feature of the present invention is that such an effect can be combined with Faraday rotation in a laser gain medium to produce an optical diode in a monolithic structure, and the light path in such a structure can be planar, as is now more fully described.

1.4 Simultaneous, Distributed Reciprocal and Nonreciprocal Polarization Transformations Discrete-element optical diodes often use a Faraday rotator for the nonreciprocal polarization transformer and a rotated linear retarder (often a halfwave plate) for the reciprocal polarization transformer. In composite planar ring oscillators which are described below, the separation of the transformations is also possible. For monolithic planar ring oscillators, however, both the reciprocal and nonreciprocal polarization transformations must coexist in the same optical medium. Separation of these two effects is possible in some cases (as described below), but it is essential to understand how to treat the simultaneous presence of a distributed linear birefringence and a distributed Faraday effect.

Consider an optical medium that exhibits pure linear birefringence in the absence of an applied magnetic field. Application of a magnetic field to this medium will modify the way in which the polarization state of light evolves while propagating through the medium. This problem has been treated by W. J. Tabor and F. S. Chen, "Electromagnetic Propagation Through Materials Possessing Both Faraday Rotation and Birefringence: Experiments with ytterbium Orthoferrite," *J. Appl. Phys.*, 40:2760-2765 (1986). The most important results of their analysis can be summarized as follows:

1) In the absence of linear birefringence, the medium exhibits pure Faraday rotation, and the eigenstates of polarization are circularly polarized 2) In the absence of Faraday rotation, the medium exhibits pure linear birefringence, and the eigenstates of polarization are linearly polarized.

3) In the presence of both the Faraday effect and linear birefringence, the eigenstates of polarization are orthogonal, elliptically polarized states.

4) The net polarization transformation depends on the direction of propagation with respect to the magnetic field. When the birefringence is large compared to the Faraday effect, the medium behaves more nearly like a linear birefringent medium. In particular, the maximum net rotation of the plane of polarization of an incident linear polarization states is small.

Detailed analysis of propagation of light in a medium with simultaneous linear birefringence and a Faraday effect can be carried out using the Jones matrices derived by Tabor and Chen. Intuitively, however, it is apparent that simultaneous linear birefringence and a Faraday effect represents a combination of reciprocal and nonreciprocal polarization transformation. Since the magnitude of the effects will depend on the direction of propagation with respect to the magnetic field, such a combined reciprocal and nonreciprocal effect can be used as a component of an optical diode. The only other necessary component for the optical diode is a partial polarizer.

Both the monolithic nonplanar ring oscillators of the prior art and the novel monolithic planar ring oscillators of this invention rely on the Faraday effect of the laser medium in the presence of an external magnetic field. The Faraday effect in laser media is typically extremely weak. Accordingly, to cancel the weak nonreciprocal Faraday effect for one direction of propagation around a ring light path requires a weak reciprocal polarization transformation. The important consequences of this idea in the context of monolithic nonplanar ring oscillators have been described by Trutna Jr., Donald, and Nazarathy, and Nilsson, Gustafson, and Byer. The conclusion of these analyses is that optimal performance of the optical diode requires careful balancing of the Faraday rotations by weak reciprocal polarization transformations. For nonplanar ring oscillators, the implication is that the geometry of the ring light path should be only slightly nonplanar if best performance is to be achieved. By analogy, the reciprocal polarization effects in a planar ring oscillator should also be weak in order to achieve best performance This is the advantage of using induced birefringence rather than intrinsic birefringence. The magnitude and sense of the reciprocal polarization effect in an initially optically isotropic medium can be controlled by changing the magnitude and direction of the externally applied influence that induces the birefringence. The induced effect can thus be a small perturbation on the initial isotropy of the laser medium, as is the induced Faraday rotation, and the tunability of the birefringence effect makes it possible to optimize performance. In a naturally birefringent medium, the weak Faraday effect is typically much smaller than the linear birefringence of the medium. This does not imply that unidirectional operation is impossible to achieve in a naturally birefringent medium, but optimal operation is undoubtedly more difficult to achieve.

A pertinent analogy arises in the case of monolithic nonplanar ring oscillators. The original monolithic nonplanar ring oscillators of Kane and Byer had light paths in which the two principal planes of propagation were orthogonal to each other. In such a light path the reciprocal polarization effects of the nonplanar geometry are large compared to the Faraday rotation. As described by Trutna Jr., Donald, and Nazarathy and Nilsson, Gustafson, and Byer this orthogonal geometry greatly reduces the strength of the optical diode, but it by no means prevents unidirectional oscillation, as the experiments of Kane and Byer have shown.

An additional complication of using naturally birefringent media with large inherent birefringences is the presence of significant anisotropic optical effects such as Poynting vector walkoff, bireflectance at total internal reflection interfaces, and temperature dependences of birefringences. These effects complicate the design and analysis of workable ring lasers. Therefore, the majority of the assertions made in this application pertain to ring lasers in which the gain medium is initially optically isotropic, and in which the optical diode depends for its success upon an induced birefringence in the laser medium to cancel an induced Faraday rotation.

1.5 Frequency Tuning

For many applications, it is important to be able to tune the frequency of the ring laser radiation. It should be apparent that, in addition to providing unidirectional oscillation, the magnitudes and directions of the applied magnetic field and either stress and/or electric field, as appropriate, will also determine the allowed frequency of oscillation of the laser. By changing the applied fields, the laser frequency can be tuned. Prior art use of the photoelastic effect to tune the output frequency of a monolithic solid-state laser with a linear cavity is described in Owyoung et al., "Stress-induced tuning of a diode-laser-excited monolithic Nd:YAG laser," Opt. Lett. 12, 999–1001 (1987), J. J. Zayhowski and A. Mooradian, "Frequency-modulated Nd:YAG microchip lasers," Opt. Lett., 14:618–620 (1989), and J. J. Zayhowski and A. Mooradian, "Single-Frequency Microchip Nd Lasers," Opt. Lett., 14:24–26 (1989). The use of the photoelastic effect to tune the frequency of a monolithic nonplanar ring oscillator is described in Kane and Cheng, "Fast Frequency Tuning and Phase Locking of Diode-Pumped Nd:YAG Ring Lasers," Opt. Lett. 13, 970–972 (1988). The theory of tuning the frequency of a monolithic nonplanar ring oscillator by changing the magnitude of the applied magnetic field is given by Nilsson, Gustafson, and Byer.

To achieve continuous tuning over a large range, it is desirable for the laser to have a large separation between adjacent axial modes. To achieve this effect, the round trip path length of the cavity should be made as short as possible. Clearly, monolithic linear cavities can be made smaller than ring laser cavities. Standing wave cavities do not, however, offer the resistance to feedback inherent in the unidirectional ring lasers. Among ring lasers, a three-reflection planar ring oscillator concept makes possible the shortest round trip path lengths. Accordingly, the three-reflection planar ring oscillator should have the largest continuous tuning range available among monolithic ring oscillators. By combining temperature tuning (a slow effect) and rapid tuning via the photoelastic effect (and/or the electrooptic effect), the monolithic planar ring oscillator offers all of the performance features of the monolithic nonplanar ring oscillator with respect to the linewidth of the free-running laser and the ability to lock the laser tightly to an external standard. (See Kane, Nilsson, and Byer, Day et al., "30-Hz-linewidth, diode-laser-pumped, Nd:GGG nonplanar ring oscillators by active frequency stabilization," Elect. Lett. 25, 810–811 (1989).) Composite resonators in which there is a physical gap between at least two of the solid-state elements defining the ring light path can be tuned additionally by varying the round trip light path by changing the separation or separations between elements of the ring. This mechanism for tuning provides a large tuning range at a comparatively slow rate, whereas the strain tuning and electro-optic tuning mechanisms offer smaller tuning ranges and higher tuning rates.

1.6 Pumping

The advantages of longitudinal pumping of linear and ring lasers have been emphasized many times in the prior art. Each reflection vertex defining the ring light path represents a potential pumping port. In all demonstrated prior art monolithic nonplanar ring lasers, all reflections except for one have been total internal reflections. Total internal reflection vertices preclude mode-matched longitudinal reflection vertices preclude mode-matched longitudinal pumping. Proposals or using dichroic mirror coatings instead of total internal reflections have been presented in Nilsson et al., U.S. patent application Ser. No. 332,232. This concept is used in certain embodiments of this invention in connection with longitudinal pumping of monolithic and composite planar ring oscillators. Several of the embodiments presented below explicitly illustrate the idea of longitudinal pumping at several reflection vertices. The principal advantage of multiport pumping is that higher power operation of the unidirectional ring oscillator can be achieved for those cases in which the single-port pump power is limited. Diode laser pumping, for example, often limits the total output power available from current devices.

The product literature of Electro-Optics Technology, Inc., may refer to the use of the concept of multiport longitudinal pumping. The product literature states that "An important feature of the PRO is that it can be pumped by multiple diodes." It is not stated whether the multiple diodes pump the resonator through a single pump port or are used at multiple pump ports. Of interest, the concept of multiport pumping appears in the patent applications of Trutna, Jr. and Berger and Nazarathy.

1.7 Advantages of the Invention for Monolithic Ring Lasers

Focusing for the moment on monolithic ring lasers, the advantages of the novel approach to inducing unidirectional oscillation in accordance with the teachings of this invention relate to efficiency of operation, simplicity and precision of fabrication, optimization of differential loss within the resonator, and frequency tunability.

1) Efficiency. In general, propagation in an optical medium and reflection from optical surfaces involves some loss associated with scattering and absorption. These effects reduce the efficiency of any laser. Additionally, the scattering causes power coupling between the two directions of propagation in a ring laser, as is well known from ring laser gyroscope studies. In general, then, both the efficiency of laser operation and the ease of inducing unidirectional oscillation are improved by reducing the number of reflections defining the ring light path to a minimum. The smallest number of reflections that can define a ring light path is three, and the ring light path that results from the use of three reflections is planar in a monolithic structure. Monolithic nonplanar ring oscillators require at least four reflections to define the nonplanar ring light path that makes unidirectional oscillation possible in optically isotropic media. The present invention presents the advantage of making unidirectional oscillation possible in a planar ring defined by three reflections, which leads to improved efficiency and reduced coupling between counterpropagating directions.

2) Ease of fabrication. Because fewer optically polished surfaces are required in the three-reflection planar ring device, and because the normals to the reflection surfaces are coplanar, the fabrication of a three-reflection planar ring oscillator is simpler than the fabrication of any nonplanar ring oscillator. Reduced fabrication costs and improved accuracy of production are significant benefits of the monolithic planar ring oscillator constructed in accordance with this invention.

3) Optimization of differential loss. A significant advantage of the present invention relates to the tunability of the induced birefringence. The magnitude and direction of the reciprocal polarization effects of the induced birefringence can be altered experimentally to achieve optimal laser performance. In contrast with monolithic nonplanar ring oscillators of the prior art, the reciprocal polarization effects are determined by the geometry of the fabricated laser crystal, which cannot easily be altered once fabrication is completed.

4) Frequency tunability. The magnitude and direction of the induced birefringence and the amount of Faraday rotation can be changed in order to tune the frequency of the laser. The changes in the amount of birefringence and Faraday rotation in the resonator result in changes in the optical path length of the ring light path, thereby shifting the frequency of the laser. Additionally, in composite resonators with a physical separation between at least two of the solid-state elements defining the ring light path, tuning of the laser frequency can be achieved by changing the separation or separations between elements of the ring.

2. Monolithic Unidirectional Planar Ring Oscillators

2.1 Monolithic Three-Reflection Planar Ring Oscillators

The monolithic planar ring oscillators described herein are laser pumped solid-state lasers in which the light path is planar. The number of reflections in a round trip may be any integer greater than or equal to three. For three-reflection monolithic planar ring oscillators, the light path is necessarily planar, whereas rings with four or more reflections may be planar or nonplanar. The embodiments presented herein are all defined to be planar. In each embodiment shown, the optical diode is produced by a combination of the Faraday effect, birefringence with principal axes rotated with respect to axes parallel and perpendicular to the plane of propagation on at least one leg of the planar ring light path, and a linear partial polarizer effect associated with reflection from a multilayer dielectric coated output coupler. The birefringence and Faraday effect may occur simultaneously in a distributed fashion, or in certain special cases the birefringence effect may be substantially separated from the Faraday effect.

2.1.1 General, Asymmetric Case

Figure 1B:
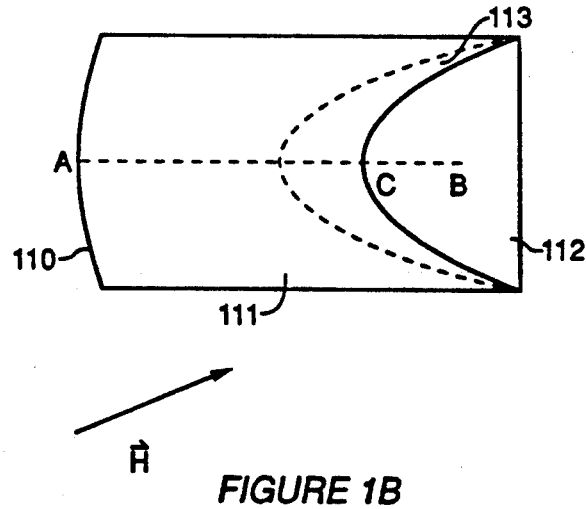
Figure 1C:
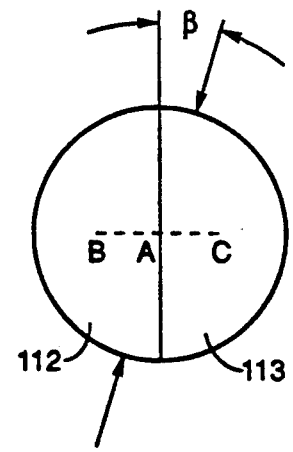

FIGS. 1a, 1b, and 1c show top, side, and end views of a general, unidirectional monolithic planar ring oscillator 100 in which the light path ABC is defined by three reflections. As shown here, monolithic resonator 100 is fabricated from a right circular cylinder of an optically isotropic laser gain medium with a nonzero Verdet constant. End-cap surface 110 can be spherical, aspherical, or planar. Surface 111 is the remaining cylindrical surface after fabrication of end-cap surface 110 and reflecting facets 112 and 113. Surface 110 is a multilayer dielectric coated surface that acts both to transmit the pump radiation 115 from the external laser pump source 114 and to couple out the unidirectional ring laser radiation 116 from the monolithic resonator 100. Surfaces 112 and 113 are taken to be flat facets at which either total internal reflection or approximately total reflection from multilayer dielectric mirror coatings occurs.

A magnetic field H is applied to laser resonator 100 such that the field is not perpendicular to all of the legs of the light path. Therefore, this magnetic field produces Faraday rotation in two or more legs of the light path. In FIG. 1 a linear birefringence is induced in the monolithic resonator 100 by applying a stress across the diameter of the rod. Line contacts along the rod surface 111 are shown in the end view of FIG. 1c. The principal axes of the applied stress are rotated by an angle $\beta$ with respect to the plane of propagation of the light. This angle $\beta$ is chosen such that the resulting linear birefringence has its principal axes also rotated with respect to the plane of propagation of the light. In this way a distributed linear birefringence with principal axes rotated with respect to the plane of propagation of the light is established in monolithic resonator 100.

The nonreciprocal Faraday effect and the rotated linear birefringence serve as the nonreciprocal and reciprocal polarization transformations required to make an optical diode. The amplitude anisotropy of reflection from the output coupler at vertex A serves as the linear partial polarizer of the optical diode. By properly selecting the magnitudes and directions of the applied magnetic field H and the applied stress, unidirectional oscillation is established in monolithic planar ring oscillator 100.

More generally, at least one of the reflections defining the light path is presumed to act as a linear partial polarizer, and at least one of the reflections occurs at an interface that permits laser end-pumping of the laser medium. The remaining reflections could, for example, by high reflectors for the ring laser radiation or could be total internal reflections. No claims of special symmetries are made about this most general of three-reflection planar rings. In fact, however, preferred embodiments will generally take advantage of imposed symmetries as described below in order to simplify analysis and design, improve performance, and reduce manufacturing complexity and cost. In what follows, all of the ring light paths and the resonator structures that produce these ring light paths are considered to have a plane of mirror symmetry that is perpendicular to the plane of propagation of the light and that intersects the plane of propagation in a line that bisects the apex angle at vertex A.

2.1.2 Symmetric, Faceted Rod

Figure 2A:
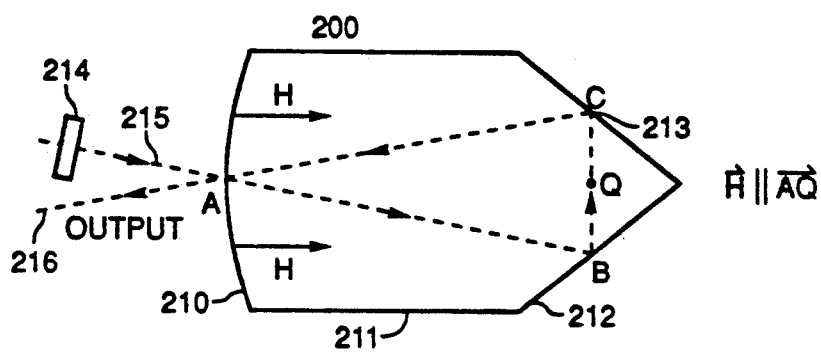
FIGS. 2(a)-2(c) depict a symmetric, three-reflection monolithic planar ring oscillator similar to that of FIG. 1.
Figure 2B:
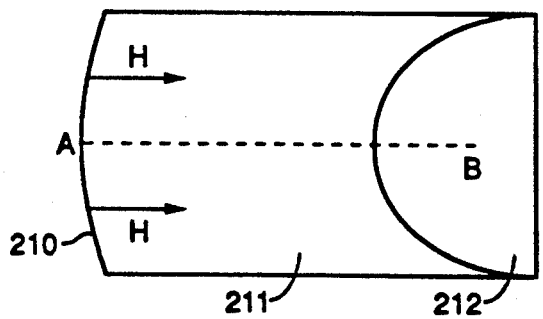
Figure 2C:
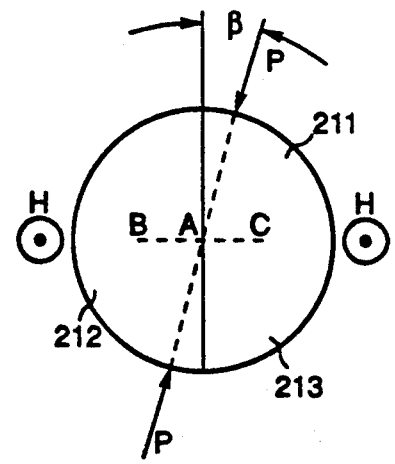

FIGS. 2a, 2b, and 2c show top, side, and end views of a preferred embodiment of a monolithic, unidirectional planar ring oscillator. Box 214 represents an external source of pump radiation 215 used to excite ring laser resonator 200 by longitudinal pumping through vertex A on dichroic output coupler 210. Ring laser 200 oscillates unidirectionally to produce output radiation 216 as shown. Monolithic resonator 200 is fabricated from a right circular cylinder of an optically isotropic, solid-state laser medium with a nonzero Verdet constant. The right circular cylinder is modified by grinding and polishing end-cap 210 and facets 213 and 212. Surface 211 is the remaining, unmodified portion of the cylinder wall.

The ring light path within monolithic resonator 200 is defined by reflections at vertices labeled A, B, and C. In one embodiment, triangle ABC is an isosceles triangle. The auxiliary point labeled Q is the midpoint of leg BC. An external magnetic field is applied parallel or antiparallel to AQ in FIG 2, but the minimal requirement on the external magnetic field is that it not be perpendicular to the plane of propagation. Surface 210 producing the reflection at A is a flat or curved, multilayer dielectric coated surface that serves as the output coupler for ring laser 200 and also admits laser pump light 215 used for end-pumping. The shape of surface 210 is chosen in accordance with the requirement that laser resonator 200 be a stable resonator with respect to its Gaussian beam modes. If surface 210 containing point A is taken to be a curved surface, it may either be spherical or alternatively may be chosen to have two different principal radii of curvature parallel and perpendicular to plane ABC in order to reduce the astigmatism of laser resonator 200. Surfaces 212 and 213 producing the reflections at vertices B and C, respectively, are taken to be flat, polished facets. In this embodiment, the angles of the isosceles triangle ABC are chosen such that the reflections at vertices B and C are total internal reflections. Analysis of the geometry of light paths required to produce total internal reflection at vertices B and C and to avoid total internal reflection at A is included as Appendix A of this specification.

The optical diode for this embodiment is created by a combination of induced linear birefringence in the laser medium, Faraday rotation in the laser medium, and a linear partial polarizer effect associated with oblique reflection from multilayer dielectric coated output coupler 210 at vertex A. The light path of the monolithic laser of FIG. 2 is defined by three reflections, and hence is necessarily planar. A compressive stress is applied along the diameter of the rod from which monolithic laser 200 is made, as shown in the end view of FIG. 2c. This stress is applied by line contacts running parallel to the rod's axis, the contact lines being diametrically opposite. The length of the contact lines is variable. The axis of application of the compressive stress makes an angle $\beta$ with the perpendicular to the plane of propagation ABC. Principal axes of the induced birefringence are parallel and perpendicular to the applied stress for isotropic materials such as laser glasses and for garnet crystals such as Nd:YAG if the cylinder axis corresponds to the usual [111] crystal direction.

As shown in FIG. 2a, the external magnetic field is applied parallel to AQ. The Faraday effect thus occurs along legs AB and AC but not along leg BC, which is perpendicular to the applied magnetic field. In this embodiment the polarization transformation associated with propagation along legs AB and AC involves a combination of distributed birefringence and simultaneous Faraday rotation. The amplitude anisotropy of reflection from the output coupler at vertex A and the combined reciprocal and nonreciprocal transformations along legs AB and AC leads to different eigenpolarizations with different losses for the two directions of propagation.

2.1.3 Cylindrically Symmetric Rod

Figure 3A:
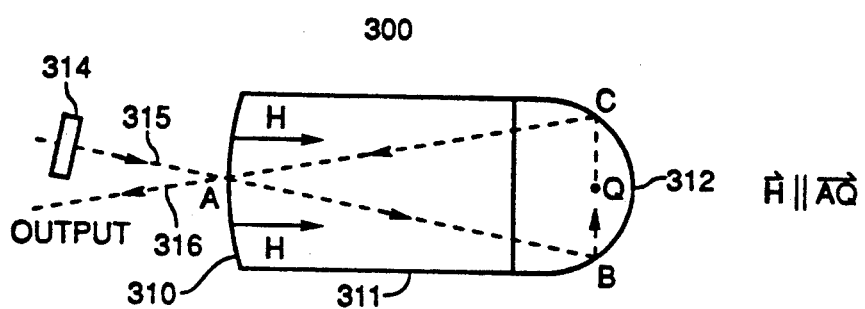
FIGS. 3(a)-3(c) show a cylindrically symmetric, alternative embodiment of the monolithic planar ring oscillator of FIG. 2.
Figure 3B:
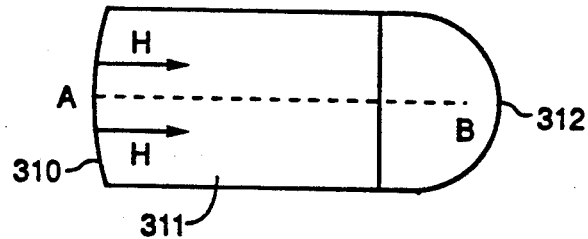
Figure 3C:
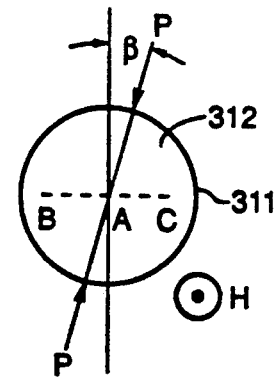

FIGS. 3a, 3b, and 3c depict an alternative embodiment of the monolithic planar ring laser of FIG. 2. The description of the excitation of the resonator and of the operation of the optical diode is the same for the resonators of FIGS. 2 and 3. In the embodiment of FIG. 2 a right circular cylinder was modified by faceting with flat reflecting facets. In the embodiment of FIG. 3 laser resonator 300 is cylindrically symmetric. Flat reflecting facets 212 and 213 of the embodiment of FIG. 2 are replaced with spherical end cap 312 of the embodiment of FIG. 3. The center of curvature of spherical end caps 312 and 310 are taken to lie on the axis of the cylinder. The radii of curvature of end cap 312 and output coupling surface 310 are chosen to produce an isosceles triangle light path in which 1) total internal reflection occurs at vertices B and C, and 2) laser resonator 300 admits stable Gaussian beam modes.

A significant advantage of this approach to making the monolithic ring resonator is that the fabrication technology is identical to that used for making linear monolithic resonators. Moreover, because of the cylindrical symmetry of the body of laser resonator 300, the plane of propagation of the light path is determined only by the choice of the plane of incidence for the pump radiation 315. For crystalline laser media such as Nd:YAG in which the cylinder axis is usually the [111] crystal direction, it is advantageous to be able to apply the transverse stress at any arbitrary azimuthal angle about the cylinder axis. In this way, optimal directions for applying the stress can be found experimentally without requiring additional crystal orientation information during the fabrication process.

2.1.4 Prism

FIGS. 4a, 4b, and 4c show an embodiment of a monolithic, unidirectional, planar ring oscillator in which resonator 400 has a different geometry than that shown in the embodiments of FIGS. 2 and 3. Monolithic resonator 400 is fabricated from an optically isotropic, solid-state laser medium with a nonzero Verdet constant. The final shape of laser resonator is a prism shape. The surfaces of resonator 400 are input coupling surface 410, reflecting facets 412 and 413, sides 411 and 414, top 419, and bottom 418. Input coupling surface 410 could be spherical, aspherical or flat as described in the previous embodiments. Box 415 represents a source of pump radiation 416 used to excite laser resonator 400, which oscillates unidirectionally to produce output radiation as shown.

In this embodiment the externally applied stress can be applied locally along leg BC as shown in FIG. 4 in such a way that 1) the influence of the stress is localized to be significant only on leg BC, and 2) the principal axes of the stress are rotated with respect to the s and p basis vectors of propagation along leg BC. Such a stress can be applied with normal forces or shear forces. In the embodiment of FIG. 4, the external magnetic field is once again taken to lie along AQ, although this is not essential. Making the simplifying assumption that the stress-induced birefringence along legs AB and AC is negligible, the polarization transformations around the ring are simply described. Faraday rotation occurs along legs AB and AC, and a reciprocal transformation associated with rotated birefringence occurs along leg BC. The optical diode results from the combination of the amplitude anisotropy of the mirror at vertex A, the nonreciprocal rotations on legs AB and AC, and the reciprocal transformation on leg BC.

The analysis of the optical diode resulting from this system is the same as that performed previously for the four-reflection monolithic nonplanar ring oscillator by Nilsson, Gustafson, and Byer. The analysis for the current system and its relation to the analysis by Nilsson, Gustafson, and Byer is included as Appendix B in this specification.

2.1.5 Electro-Optic Version

Figure 5A:
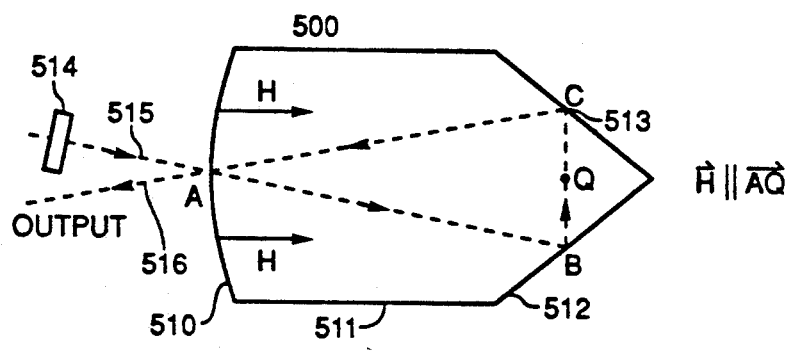
FIGS. 5(a)-5(c) show an alternative embodiment of the monolithic planar ring oscillator of FIG. 2.
Figure 5B:
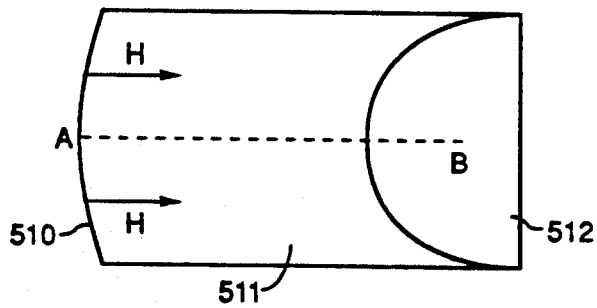
Figure 5C:
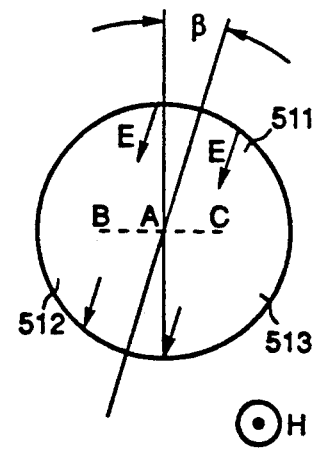

FIGS. 5a, 5b, and 5c show an embodiment of a monolithic, unidirectional, planar ring oscillator 500 that could be implemented in a noncentrosymmetric cubic laser medium exhibiting the linear electrooptic effect. In this embodiment a uniform electric field is applied to the laser medium in such a way that the principal axes of the resulting induced linear birefringence are rotated by an angle $\beta$ with respect to the axes parallel and perpendicular to the plane of propagation of the light. The resulting polarization transformations are in the same form as those described previously using the photoelastic effect.

Of importance, in accordance with the teachings of this invention, all of the various embodiments of FIGS. 1 to 5 described above for the photoelastic effect now can be repeated by substituting the electrooptic effect for the photoelastic effect. In the interest of brevity, these variations are not explicitly repeated here.

2.1.6 Multiple Actuators

Figure 6A:
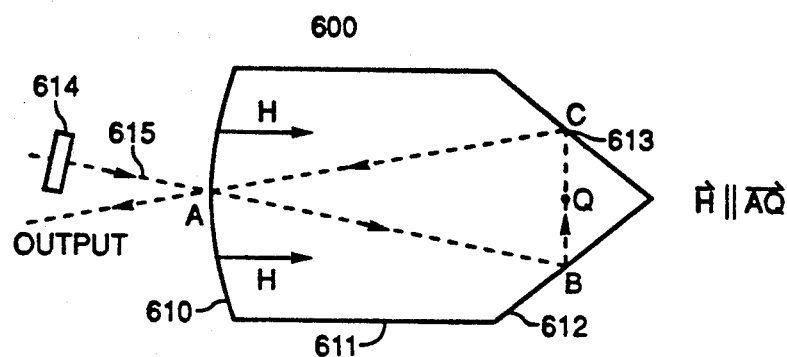
FIGS. 6(a)-6(c) an alternative embodiment of the monolithic planar ring oscillator of FIG. 2 incorporation two different applied stresses.
Figure 6B:
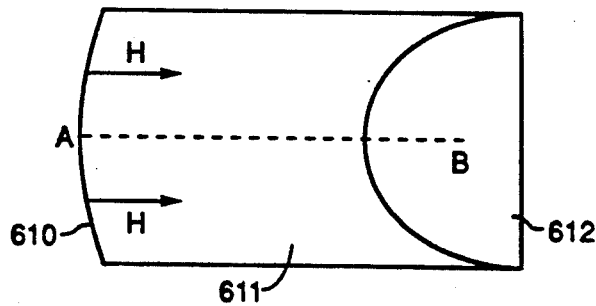
Figure 6C:
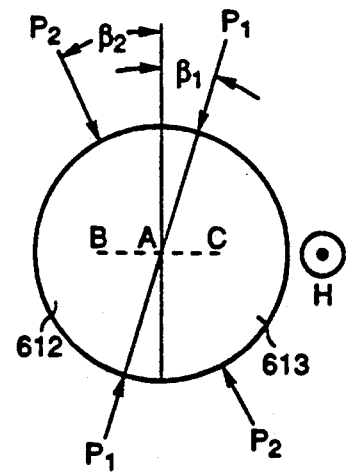
Figure 7A:
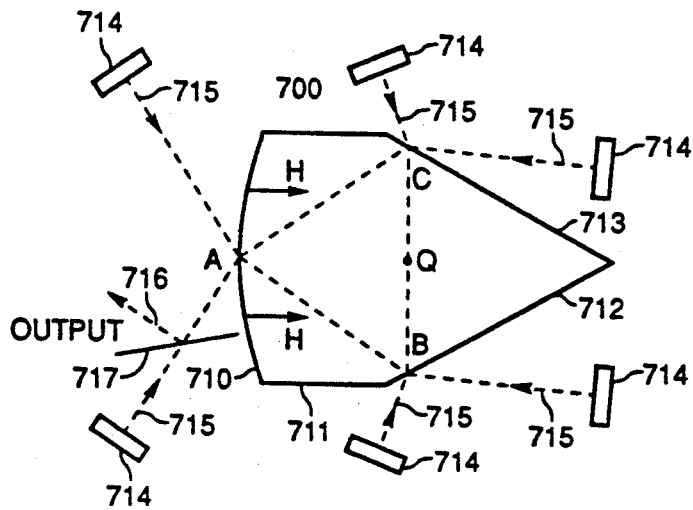
FIGS. 7(a)-7(c) show two embodiments of a monolithic planar ring oscillator in which no total internal reflections occur and in which dichroic mirror coatings are used in order to reflect ring laser radiation and to transmit pump laser radiation.
Figure 7B:
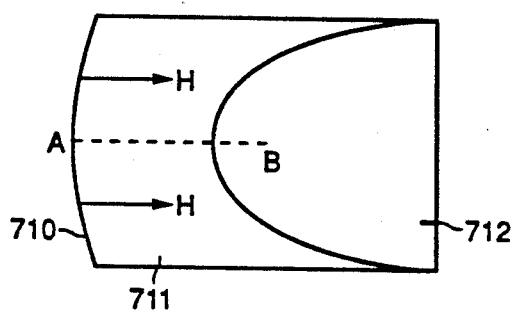
Figure 7C:
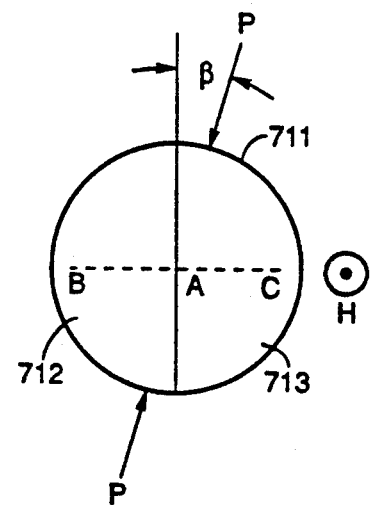
Figure 7D:
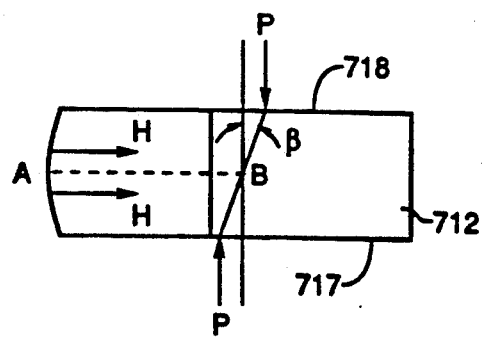
Figure 7E:
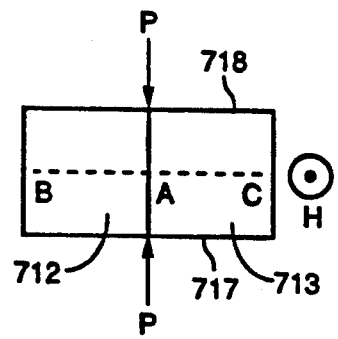

To this point the embodiments shown have only contained a single external influence for inducing linear birefringence. For purposes of modulation (for example, switching directions of oscillation of the ring laser, or providing a small frequency dither or tuning about some initial setpoint) it may be useful to apply more than one such external influence to the laser cavity. FIGS. 6a, 6b, and 6c show an embodiment similar to that of FIG. 2 except that two externally applied stresses P1 and P2 are shown. For cases in which the electrooptic effect is available, one could consider two different electric field structures, or any combination of stresses and electric fields.

2.1.7 Multiport Pumping

FIG. 7 shows an embodiment of a monolithic, unidirectional planar ring oscillator similar to that of FIG. 1, where the angles of isosceles triangle ABC have been chosen such that total internal reflection does not occur at any of the reflection vertices. Instead, the reflections at vertices B and C involve reflection from dichroic high reflectors chosen to have minimal amplitude anisotropy for the ring laser radiation and to be maximally transmitting for pump radiation. The advantage of this embodiment is that longitudinal pumping can occur at all of the reflection vertices. FIG. 7a shows longitudinal pumping along all of the legs of the light path. Especially when diode laser pump sources are used, the ability to increase the total pump power and maintain the advantages of longitudinal pumping is attractive for producing high power ring laser radiation with good spatial and temporal properties. A special case of the isosceles triangle light path is the equilateral triangle light path. For materials with index of refraction less than approximately 2.0 at the ring laser wavelength, an equilateral light path is an acceptable solution for avoiding total internal reflection at each of the three reflections, as is discussed in Appendix A of this specification.

2.2 Monolithic Unidirectional Planar Ring Oscillators Defined by Four or More Reflections The advantages of the three-reflection ring have been outlined above. With respect to ability to achieve optimal performance of an optical diode in a given monolithic laser medium with a given index of refraction, it is sometimes useful to use ring light path geometries with more reflections in a round trip. For example, the implications of the restrictions associated with total internal reflection phase shifts in a given medium have been discussed by Nilsson, Gustafson, and Byer; Nilsson and Byer (U.S. patent application Ser. No. 332,232); and Rea, Jr. and Nilsson, U.S. patent application Ser. No. 332,010 in connection with optimal design of optical diodes in monolithic nonplanar ring oscillators. An additional advantage of including more reflections in a round trip is that more pumping ports become available, which is important for high power applications. This advantage has been discussed previously in Nilsson and and Byer (U.S. patent application Ser. No. 332,232). The choice of an even or odd number of reflections in a round trip has other implications for the image and polarization transformations in a ring laser. Some of these implications are presented in S. V. Kruzhalov et al., "Optical isolators in YAG:Nd laser cavities," Sov. Phys. Tech. Phys. (1985) 30:1145–1147.

2.2.1 Symmetric, Four-Reflection, Faceted Rod

Figure 8A:
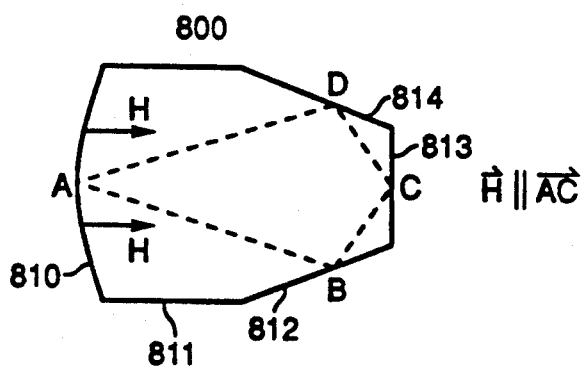
FIGS. 8(a)-8(e) are embodiments of a monolithic planar ring oscillator in which the ring light path is defined by four reflections.
Figure 8B:
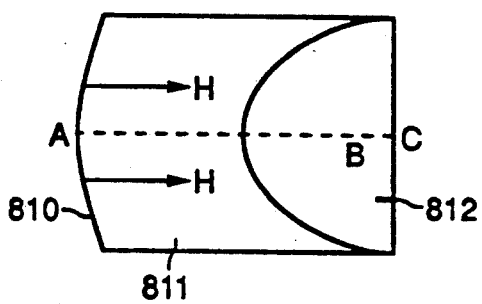
Figure 8C:
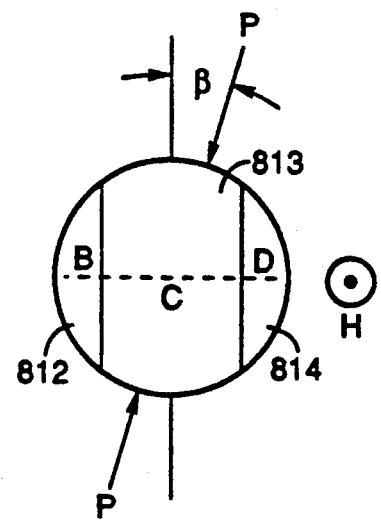
Figure 8D:
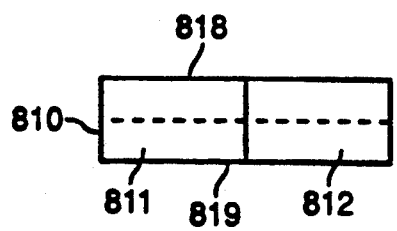
Figure 8E:
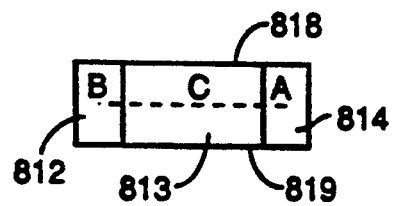

FIGS. 8a through 8c show an embodiment of a monolithic, unidirectional planar ring oscillator 800 in which the planar ring light path is defined by four reflections at vertices A, B, C, and D. The discussion of the pumping of the resonator, the application of stress (and/or an electric field when using electro-optic media), the application of the magnetic field, and the operation of the resulting optical diode are similar to what has been described above in connection with three-reflection rings constructed in accordance with the teachings of this invention. FIG. 8a together with FIGS. 8d and 8e represent an alternative embodiment of the four-reflection monolithic nonplanar ring oscillator of FIGS. 8a–8c, differing only in the

2.2.2 Symmetric, Five-Reflection, Faceted Rod

Figure 9A:
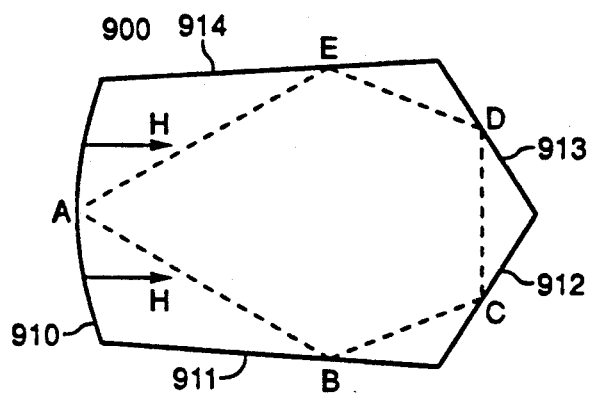
FIGS. 9(a)-9(c) are embodiments of a monolithic planar ring oscillator in which the ring light path is defined by five reflections.
Figure 9B:
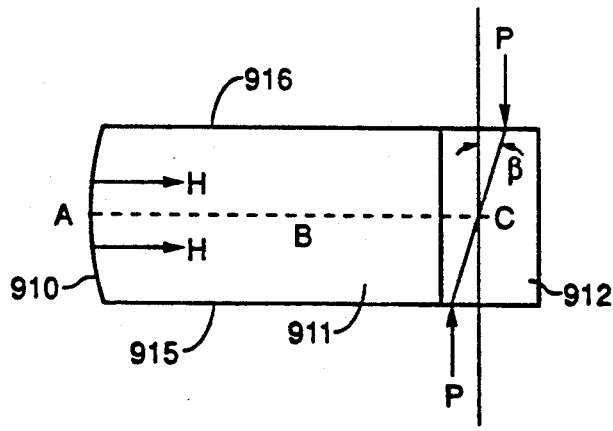
Figure 9C:
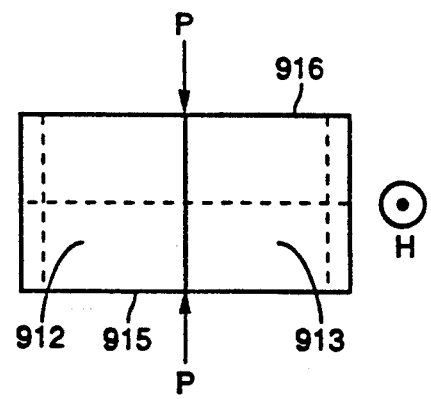

FIGS. 9a, 9b, and 9c show a monolithic planar ring oscillator 900 in which the planar ring light path is defined by five reflections at vertices A, B, C, D, and E. The light path of FIG. 9 is best suited for use with total internal reflections at all vertices except for A, because the angles of incidence at vertices B, C, D, and E are typically larger than the critical angle for typical laser gain media. A skewed stress (or electric field in the case of electro-optic media) is applied locally to leg CD.

Figure 10A:
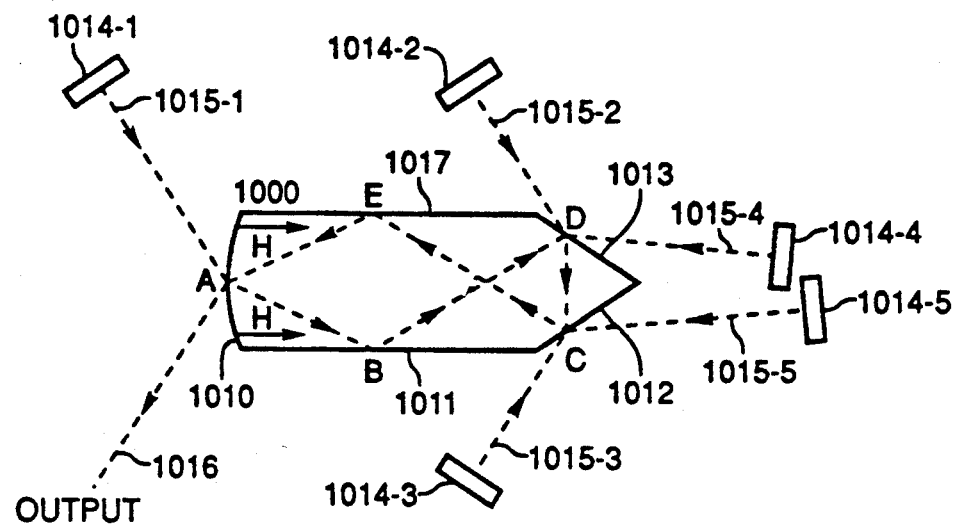
FIGS. 10(a)-10(c) are alternative embodiments of a five-reflection, monolithic planar ring oscillator.
Figure 10B:
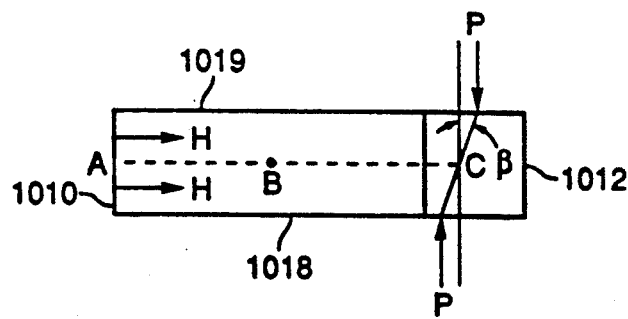
Figure 10C:
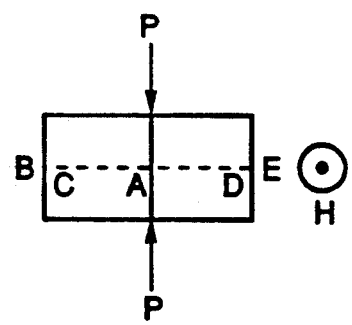

FIGS. 10a, 10b, and 10c show an alternative embodiment of a five-reflection, monolithic planar ring oscillator 1000 in which the light path enables longitudinal pumping at more than one vertex. In the example shown in FIG. 10, facets 1011 and 1017 are flat, polished facets at which total internal reflection occurs. Facets 1012 and 1013 are flat facets with dichroic mirror coatings that are high reflectors exhibiting minimal amplitude anisotropy for ring laser radiation and that are highly transmitting for the pump laser radiation. Elements 1014-1 through 1014-5 represent external sources of pump laser radiation. This embodiment is useful for applications requiring high power. Again, the optical diode involves Faraday rotation on legs AB, BD, AE, and EC together with an effectively rotated linear retarder on leg CD.

The eigenpolarization analysis of the light paths involving localized stress on the leg opposite vertex A once again reduces to the case treated by Nilsson, Gustafson, and Byer. The analysis is reproduced in Appendix B of this specification.

3. Composite Planar Ring Resonators

Composite planar ring oscillators are lasers in which the resonator structure for the planar ring light path contains at least two elements. If these elements are in contact with one another in such a way that the ring light path is entirely contained within solid-state media, the architecture of the ring is said to be closed. If, on the other hand, there is a gap between the two elements so that part of the light path is not contained within solid-state media, the architecture of the ring is said to be open. In what follows, we emphasize composite resonators containing only two solid-state optical elements, except where explicitly noted. The same principles apply to more complicated composite resonators, and we do not exclude such resonators from the scope of our teaching. We have chosen to emphasize the principles in their simplest setting for clarity.

There are two motivations for considering non-monolithic structures for a unidirectional ring laser. The first and most important is the possibility of increasing the frequency tunability of the laser (either the tuning range, the tuning rate, or both). The second motivation is to allow new approaches to optimization of operation. Once the constraint of having to incorporate all of the elements of an optical diode within a monolithic resonator made from a good laser medium is lifted, optimization of the operation of the resonator becomes simpler.

The open and closed architectures differ fundamentally in that the open architecture permits relative motion of the two elements to occur, which makes it possible to tune the laser by changing the separation between the two elements. The closed architecture does not permit relative motion.

3.1 Closed Architecture Resonators

One feature of the closed composite resonator structure is the presence of interfaces between two solid-state optical media. The form of these interfaces requires careful attention, because interfaces potentially introduce a new source of amplitude anisotropy into the analysis of the eigenpolarizations of the ring. In what follows, we restrict our discussion to embodiments of this invention utilizing two-component, closed architecture rings with planar ring light paths involving only three reflections. It is apparent to those of ordinary skill in the art in light of the teachings of this invention that embodiments with four or more reflections are easily constructed by analogy with our prior discussion of monolithic rings. We also emphasize resonators with a plane of mirror symmetry, although asymmetric embodiments can clearly by made to operate by the same principles that pertain to the simpler, symmetric resonators.

3.1.1 Interfaces between two Components

Figure 11A:
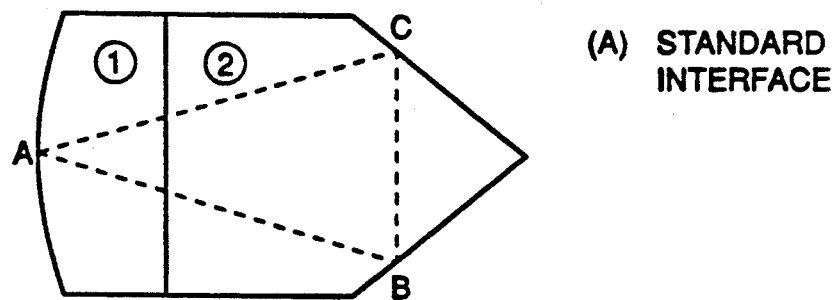
FIGS. 11(a)-11(c) show three preferred geometries for the interfaces between the two components of a two-element composite planar ring oscillator with closed architecture.
Figure 11B:
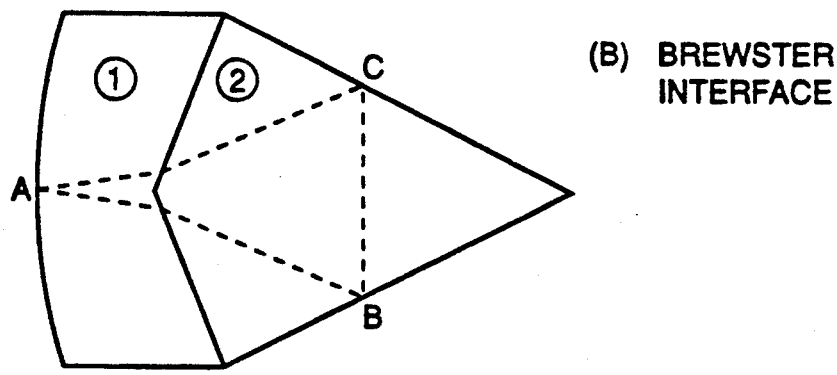
Figure 11C:
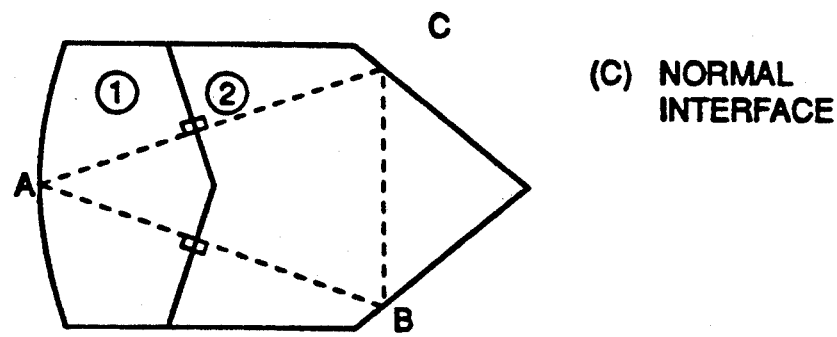

Consider a two-component, closed architecture resonator with mirror symmetry. Assume that the two components of the resonator are solid-state media with different indices of refraction. FIGS. 11a, 11b, and 11c show three natural forms for the interfaces in such resonators. FIG. 11a shows the simplest interface to fabricate, hereafter referred to as the standard interface. Plano surfaces are fabricated on the two components 1 and 2, perpendicular to the line of intersection of the plane of mirror symmetry and the plane of propagation. FIG. 11b shows a Brewster angle interface. If desired, one can choose the apex angle at vertex A such that incidence at Brewster's angle occurs with a standard interface. FIG. 11b shows a more general setting in which one can vary the apex angle at vertex A and still achieve Brewster angle incidence at the interface by changing the facet angles of the two solid-state components. Matching, tilted plano facets are fabricated on components 1 and 2 so that the angle of incidence at the interface is Brewster's angle. FIG. 11c shows another embodiment in which matching, tilted facets are shaped on components 1 and 2 such that normal incidence occurs at the interfaces.

These three different kinds of interface produce different polarization effects. In order to avoid losses and coupling of counterpropagating directions in the ring lasers owing to propagation through the interfaces, it is desirable to achieve impedance matching, by which we mean that no reflection should occur at the interface. Dielectric coatings or index-matching cement applied to the standard interface of FIG. 11a allow impedance matching of either the s or p states of polarization, but not both. The Brewster angle interface of FIG. 11b automatically produces impedance matching for the p state of polarization without the need for coatings or index-matching compounds, but the s state suffers reflection losses. Dielectric coatings or properly selected optical cement applied to the normal interface of FIG.

11c permit polarization-state-independent impedance matching of media with different indices of refraction. These three types of interface can thus be used in different situations. The standard and Brewster interfaces act as linear partial polarizers. The impedance-matched normal incidence interface has no polarization-transforming effect but potentially represents a strong source of coupling of counterpropagating beams. The embodiments described below can each be implemented with any one of the three possible interfaces. For brevity, only the standard interface cases are shown, as they represent the most easily fabricated examples.

Tilted facets in a concave V-groove configuration (such as in component 1 of FIG. 11b and component 2 of FIG. 11c) are difficult to fabricate in rings containing only two elements, although injection molding of such components is possible with certain optical glasses or plastics.

Figure 12A:
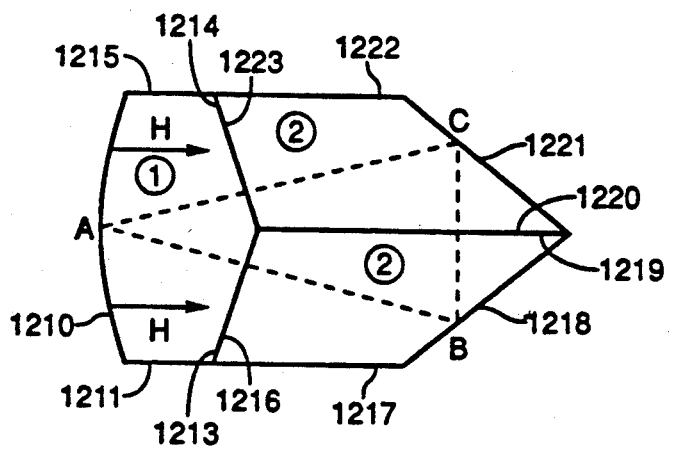
FIGS. 12(i a)-12(c) depict a three-element, composite planar ring oscillator in which the interfaces between the three solid-state components are perpendicular to the ring light path.
Figure 12B:
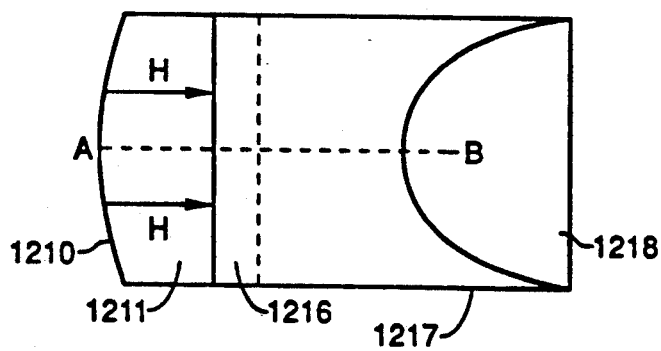
Figure 12C:
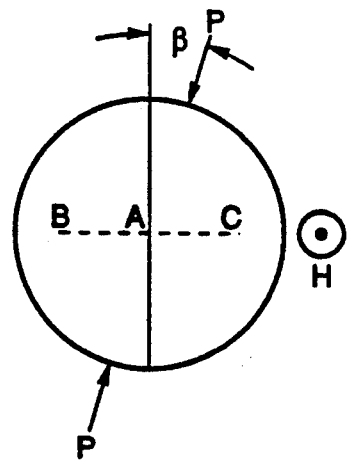
Figure 12D:
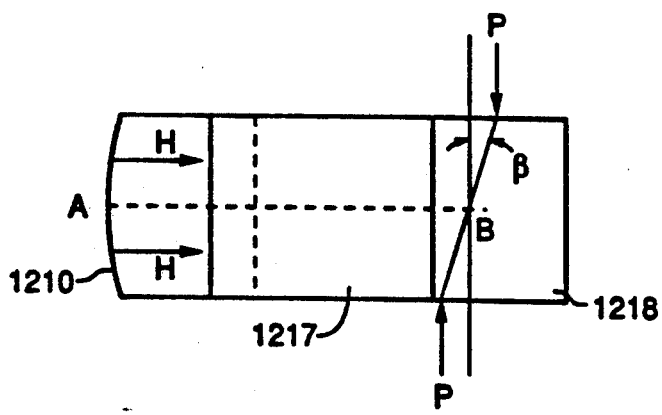
Figure 12E:
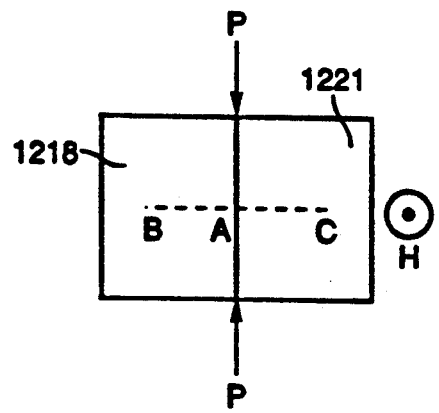

One solution to the grinding and polishing of a concave V-groove of facets for component 2 of FIG. 11c is to make component 2 from two mirror-symmetric pieces of the same medium. Such a resonator is shown in FIGS. 12a, 12b, an 12c, or alternatively in 12a, 12d, and 12e. This embodiment introduces an additional interface 1219 between the mirror symmetric parts, but this interface is a normal incidence interface between two elements with identical indices of refraction. Optical contact, use of a component-fusion technology, or index-matched cement can be used to join the two mirror-image parts together.

The side and end views of FIGS. 12b and 12c, and 12d and 12e, show two embodiments of the resonator geometry, appropriate for skewed, distributed birefringence or skewed, localized birefringence, respectively.

3.1.2 General Three-Reflection Ring with a Standard Interface

Figure 13A:
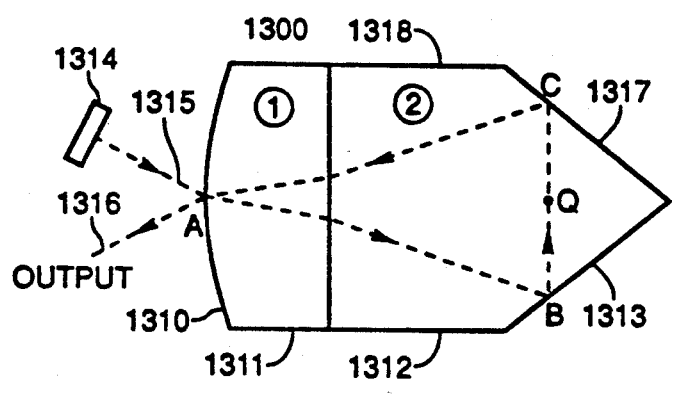
FIGS. 13(a)-13(c) show a general, two component, planar ring oscillator having closed architecture with a standard interface between the two solid-state media.
Figure 13B:
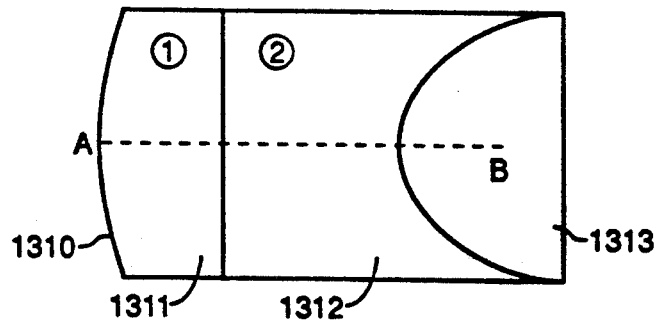
Figure 13C:
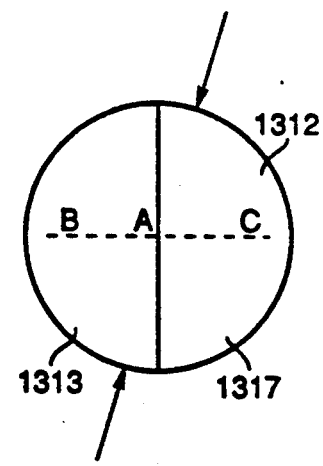

FIGS. 13a, 13b, and 13c show an embodiment of a three-reflection, two-component, unidirectional, planar ring oscillator with a closed architecture. The two solid-state elements that form the laser resonator are labeled 1 and 2. In order that the system be a laser, at least one of the two components must be a laser gain medium, and the geometry and coatings employed in defining the resonator must enable end-pumping of the gain medium and stable operation of the resonator.

In order for the system to operate unidirectionally, an optical diode must exist within the structure. In the monolithic embodiments described previously, all of the elements of the optical diode were contained within a single-element solid-state laser medium. The presence of two distinct components in the resonator opens some new possibilities. We now can create an optical diode in which the requisite polarization transformations are divided between the two elements, or they can be contained with only one element. The effects of interest for creating the optical diode are: the Faraday effect (FE) for the nonreciprocal polarization transformation; the photoelastic effect (PE), the linear electrooptic effect (EO), or natural birefringence (NB) for the reciprocal polarization transformation, and the amplitude anisotropy of oblique reflection from the output coupler together with possible amplitude anisotropy of the interfaces as the linear partial polarizer. For the embodiment which utilizes the standard interface, as shown in FIG. 13, the dominant partial polarizer effect is associated with the interface unless the two media have closely matched indices of refraction.

Possibilities for making a unidirectional planar ring laser include:

| Medium 1 | Medium 2 |
| --- | --- |
| Laser | Biref & FR |
| Biref & FR | Laser |
| Laser & FR | Biref. |
| Biref. | Laser & FR |
| Laser & Biref | FR |
| FR | Laser & Biref |
| Laser | Laser & Biref & FR |
| Laser & Biref & FR | Laser |
| Laser & Biref | Laser & FR |
| Laser & FR | Laser & Biref |

The birefringence in the above examples may, of course, be induced (via the photoelastic or electro-optic effect) or may be natural. Other possibilities also exist. One of the media may exhibit nonreciprocal magneto-optic effects even in the absence of an externally applied magnetic field, for example. Media exhibiting optical activity could also be incorporated. The minimum requirement is that at least one of the media must be an acceptable laser gain medium and that an optical diode exist in the combination of the two media and their interfaces. As in the case of the monolithic resonators, there is a choice of using total internal reflections or appropriately selected dielectric coatings to produce the reflections that define the ring light path.

Induced birefringence effects and the induced Faraday effect are of interest for tuning the frequency of the unidirectional ring laser. There are, however, additional tuning effects available, including temperature tuning and piezoelectric effects within one of the two components. Two-component resonators may be designed to have other advantages as well. For example, the thermal expansion coefficients of the two media can be chosen to be approximately equal in magnitude and opposite in sign over a range of temperatures of interest in order to produce an athermal resonator.

A particularly useful application of the embodiment of FIG. 13 involves the use of a quasi- three-level laser gain medium such as Tm: YAG, Ho:YAG, or Tm:Ho:YAG. In quasi-three-level gain media, regions of the beam path through the gain medium that are not sufficiently pumped represent a source of resonant loss for the propagating laser beam. The laser transitions of Tm3+ and Ho3+ in YAG are of particular interest for applications requiring eyesafety, such as laser radar. The embodiment of FIG. 13 can be used to provide a single-frequency output from a ring laser in which the gain medium is a quasi-three-level medium. Element 1 is chosen as the gain medium. This element is made as thin as is required to optimize the gain/loss performance of the laser component. Element 2 is selected to be an optically isotropic medium with low loss at the desired laser wavelength. A magnetic field is applied to one or both of the components to induce the Faraday effect, and a skewed birefringence is established in one or both of the elements to complete the optical diode.

3.1.3 Alternative Resonator Geometries for Three-Reflection Rings

Figure 14A:
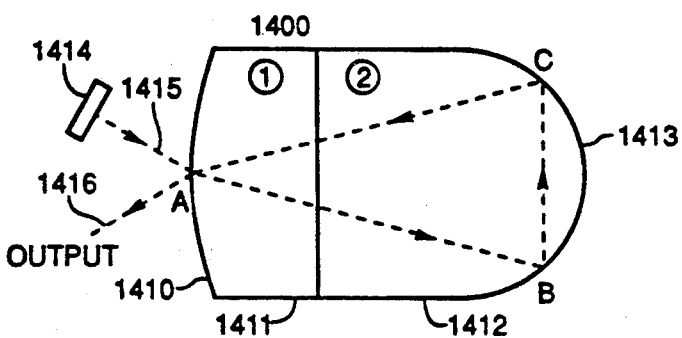
FIGS. 14(a)-14(c) show an alternative embodiment of the composite resonator of FIG. 13 in which cylindrical symmetry is preserved for the two solid-state elements.
Figure 14B:
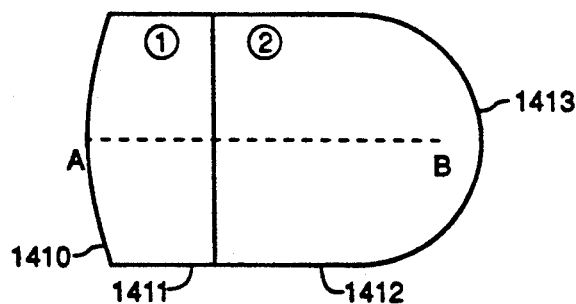
Figure 14C:
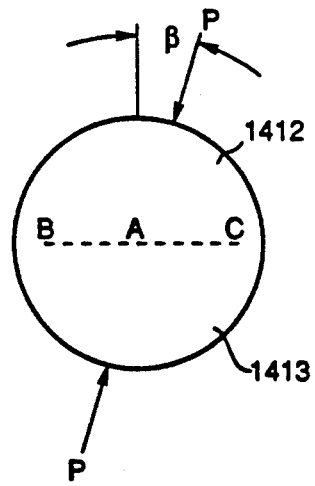
Figure 15A:
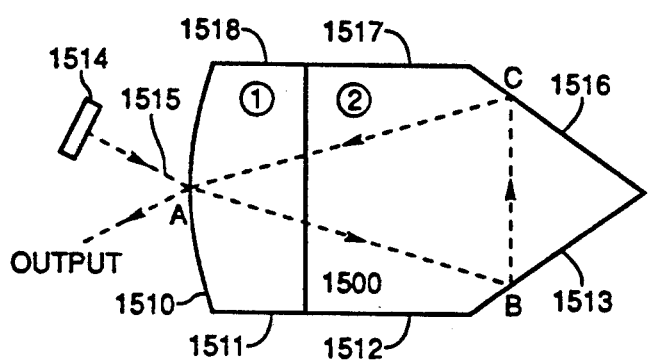
FIGS. 15(a)-15(c) show an alternative embodiment of the composite resonator of FIG. 13 in which all faces of the two elements are planar except for the face of the first element containing vertex point A.
Figure 15B:
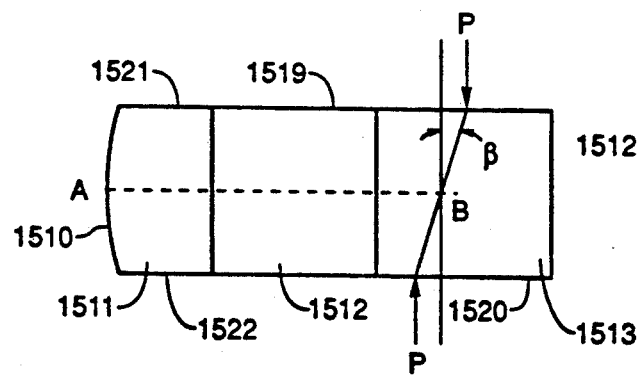
Figure 15C:
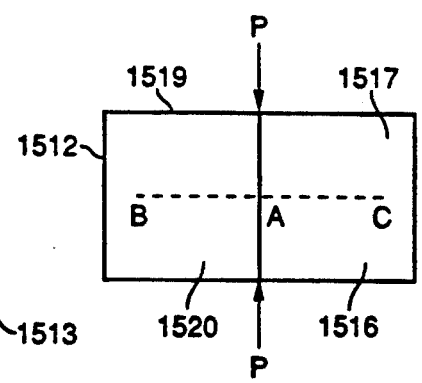

FIGS. 13, 14 and 15 show embodiments using alternative geometries for the elements forming the laser resonator, analogous to the monolithic embodiments of FIGS. 2, 3, and 4. The previous description regarding how the stress(es) or electric field(s) are applied is similar for both two-component resonators and monolithic resonators. However, in a two-component resonator, a new possibility arises: different stresses or electric fields can be applied to the two components if desired.

3.1.4 Special Five-Reflection Embodiments

Figure 16A:
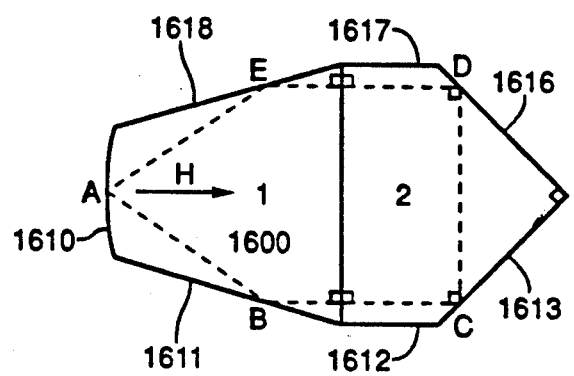
FIGS. 16(a)-16(c) are a two-component planar ring oscillator with a light path defined by five reflections.
Figure 16B:
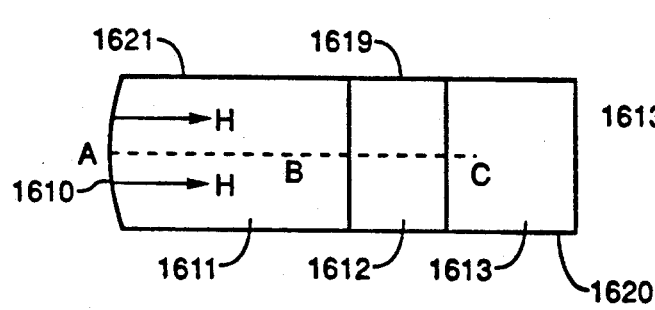
Figure 16C:
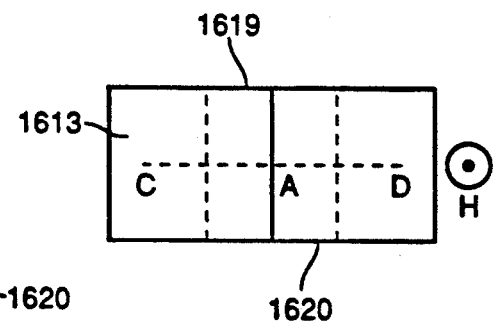

A preferred embodiment of a two-element, five-reflection planar ring oscillator is shown in FIGS. 16a, 16b, and 16c. The principal advantage of this embodiment is that the geometry of the light path can be tailored to produce normal incidence at the standard interface and a set of parallel and perpendicular legs in the second medium as shown. The normal incidence makes the interface isotropic in its polarization effects. As described previously, the interface can be made to have essentially 100% transmission for all states of polarization by proper choice of coatings, cements, or materials. The interface is thus effectively eliminated as a source of polarization transformation in the resonator. This greatly simplifies the eigenpolarization analysis of the resonator. Moreover, the particular choice of a rectangular shape for the light path in the second element simplifies the design of resonators in which the second element is naturally birefringent. For example, the natural choices for the orientation of the optical axis of a uniaxial crystal used for element two would be one of the following:

c-axis parallel to legs BC and DE;
c-axis parallel to leg CD;
c-axis perpendicular to the plane of propagation; or
c-axis in the plane of mirror symmetry of the light path.

Having an orthogonal propagation geometry in the naturally birefringent medium of the second piece (e.g. piece 1617 of FIG. 16a) makes it possible to use, for example, the electrooptic effect in uniaxial media (LiNbO3 is such a medium) to tune the optical path length without changing the state of polarization of the light propagating through the second element. Electro-optic tuning can be extremely rapid.

Similarly, if an isotropic medium is used for the second element, application of stress such that the resulting principal axes of the induced linear birefringence are parallel and perpendicular to the plane of propagation makes it possible to change the optical path length without altering the state of polarization of the light. In embodiments such as these, unidirectional oscillation can be established by using element one as the optical diode, and by using element two purely as a tuning element.

Figure 17A:
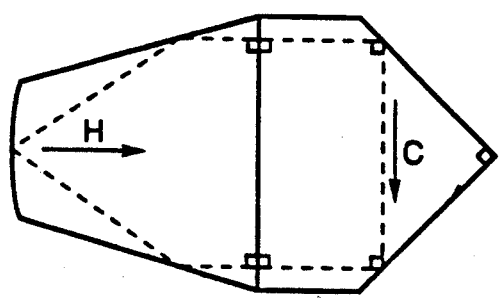
FIGS. 17(a)-17(c) are alternative embodiments of a two-component planar ring oscillator with closed architecture and a ring light path defined by five reflections.
Figure 17B:
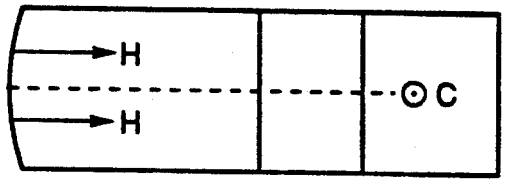
Figure 17C:
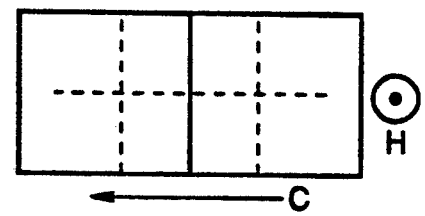

One embodiment that takes advantage of natural optical activity in crystalline quartz is shown in FIGS. 17a, 17b, and 17c. In this embodiment, the special five-reflection path makes it possible to propagate parallel and perpendicular to the c-axis (the optical axis of the uniaxial crystal) of crystal quartz. Propagation along the c-axis of crystalline quartz causes reciprocal polarization rotation. By using nonreciprocal Faraday rotation in element 1 and the reciprocal rotation in element 2, an optical diode is established for the resonator. In such an embodiment, applied stress leading to principal axes of the index ellipsoid parallel and perpendicular to the plane of propagation can be used in element 1, element 2, or both to tune the frequency of the resonator.

3.2 Open Architecture

3.2.1 Tuning Advantages

There are four main reasons to consider open architectures for composite, planar ring oscillators. First, the frequency of the laser can be tuned by physically changing the gap between one or more pairs of elements in the ring. Second, fabrication of components of the ring may be much simpler if parts do not have to match one another as in the closed architecture rings. Third, standard optical elements such as birefringent filters, prisms, etalons, apertures, quarterwave plates, etc. can be inserted into gaps in the ring where necessary to achieve desired effects. Fourth, external mirrors can be used to define parts of the light path.

The use of external mirrors can greatly simplify the fabrication of ring lasers. As an example, if a mirror coating with special properties that are difficult to produce is required, many relatively inexpensive, standard mirror substrates can be coated and tested until a mirror with the right properties is found. For example, a mirror coating on a standard optical glass, such as BK-7 can be provided in which the reflectivity of the coating at the Nd:YAG laser wavelength of 1319 nm is significantly higher than the reflectivity at the nearby Nd:YAG laser wavelength of 1338 nm. With this mirror used as the output coupler in a diode-laser pumped, two component standing wave Nd:YAG laser resonator, we have obtained laser oscillation at 1319 nm with no laser oscillation at 1338 nm. Such a laser mirror, when used in a composite Nd:YAG unidirectional ring laser resonator, permits single-axial-mode oscillation at 1319 nm and completely suppresses laser oscillation at 1338 nm. Previous experimental results by Trutna, Jr. et al. have shown that simultaneous oscillation at 1319 nm and 1338 nm occurred in a unidirectional, monolithic non-planar ring oscillator. Simultaneous oscillation at these two wavelengths can pose significant problems for applications of Nd:YAG lasers in coherent communications and fiber sensors.

Another example pertains to the use of ultralow scatter loss mirrors. These mirrors have been developed in connection with applications to laser gyroscopes, and so far these mirrors are only available on superpolished fused silica and Zerodur. Therefore, if one wants to take advantage of such mirrors in applications to unidirectional planar ring oscillators, one must use a resonator architecture involving one or more external mirrors.

For simplicity, the discussion of the embodiments that follows emphasizes open architecture planar ring lasers with only two elements in the composite resonator. However, it is readily understood by those of ordinary skill in the art in light of the teachings of this invention, that open architecture, planar ring lasers utilizing more than two elements and/or having greater than four reflections are equally applicable. All of the discussions regarding the forms of the interfaces and the shapes of the light paths given above in connection with two-element, closed-architecture planar ring lasers apply here, except that there are now potentially more interfaces owing to the existence of a gap.

3.2.2 Resonators with a Single External Mirror

Figure 18A:
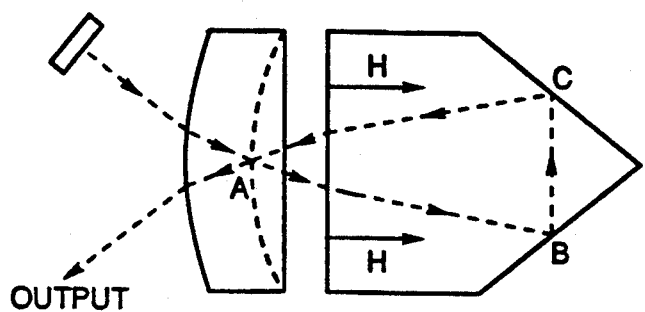
FIGS. 18(a)-18(c) are embodiments of a two-element, open architecture planar ring oscillator with a ring light path defined by three reflections.
Figure 18B:
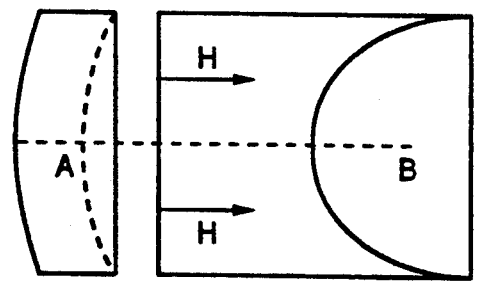
Figure 18C:
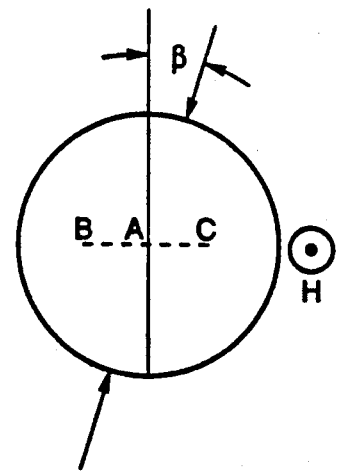

FIGS. 18, 19, and of two-component, three-reflection, open architecture, unidirectional planar ring oscillators in which the component labeled "1" in each FIG. is an external mirror that serves as the input coupler for pump radiation and the output coupler for ring laser radiation. The external mirror is physically separated from the laser gain element. The laser frequency can thus be tuned by changing the separation between elements 1 and 2. The component labeled "2" in each figure is the laser gain element and is also the element in which the combination of Faraday effect and rotated birefringence is present. The partial polarizer effect required to complete the optical diode in the resonator occurs at the points of entry and exit of the ring laser radiation from element 2, and a weaker partial polarizer effect occurs at the oblique reflection from the external mirror.

FIG. 18 shows the laser gain element as a right circular cylinder with facets, analogous to that shown in FIG. 2. FIG. 19 shows an embodiment preserving cylindrical symmetry for all of the optical elements. FIG. 20 shows the laser gain element as a block bounded by planar surfaces. The discussion of the Faraday effect and the induced birefringence in these resonators is similar to that presented in connection with their monolithic analogs in FIGS. 2, 3, and 4. The optical diode for these resonators generally involves a stronger partial polarizer effect than that of the monolithic resonators, owing to the presence of a standard interface on the laser gain medium through which the ring laser light must propagate twice in a round trip.

The advantages of using an external mirror have been adequately described above, so we do not repeat the advantages here. It is also apparent to one of ordinary skill in the art in light of the teachings of this invention that open architecture configurations with larger numbers of reflections in a round trip and with one or more external mirrors are possible as well. The simplest systems in FIGS. 18-20 are shown by way of example.

Figure 21A:
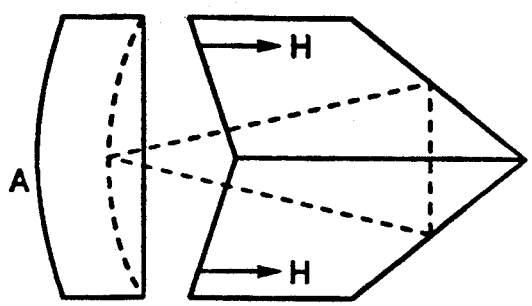
Figure 21B:
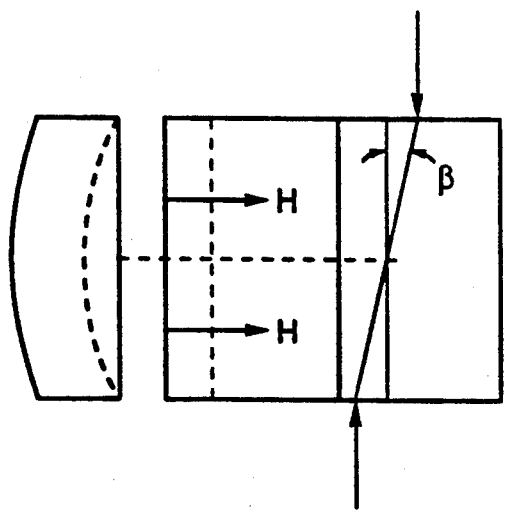
Figure 21C:
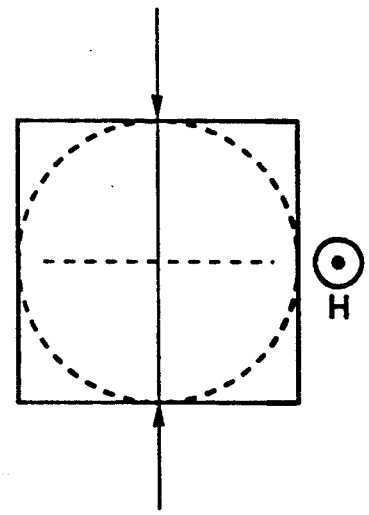

Alternative embodiments of the open architecture, three-reflection, unidirectional planar ring oscillators utilize a single external mirror. For example, instead of using standard interface as depicted in FIGS. 18-20, the Brewster or normal incidence interface is chosen. FIG. 21 shows an embodiment involving the normal incidence interface.

3.2.3. Resonators with Multiple Elements

Figure 22A:
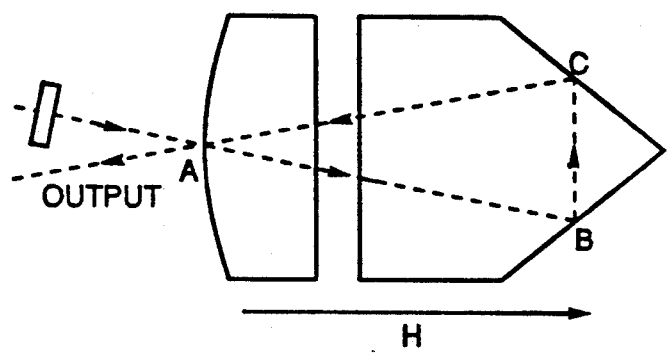
FIGS. 22(a)-22(c) show a two-element, unidirectional, planar ring oscillator in which the ring light path is defined by three reflections and involves propagation in two physically separated solid-state elements.
Figure 22B:
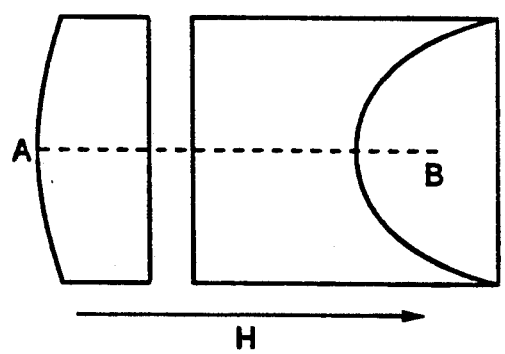
Figure 22C:
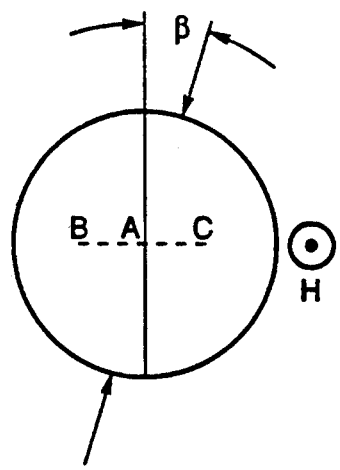
Figure 23A:
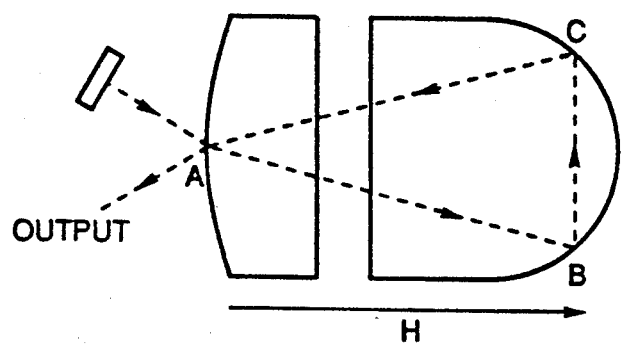
FIGS. 23(a)-23(c) are alternative embodiments of the resonator of FIG. 22 in which the solid-state elements are bounded by planar faces except for the face on element 1 that contains reflection vertex A.
Figure 23B:
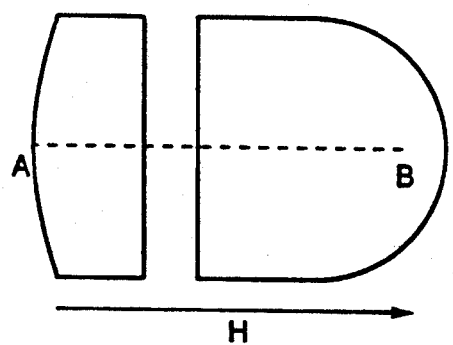
Figure 23C:
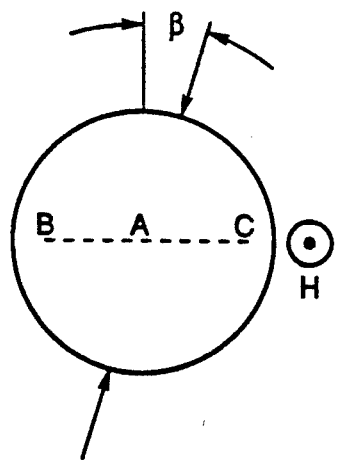
Figure 24A:
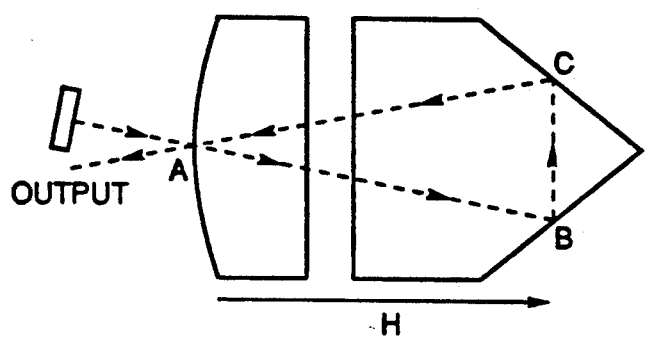
Figure 24B:
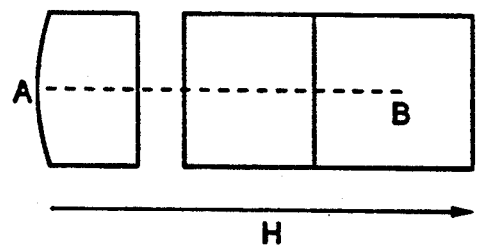
Figure 24C:
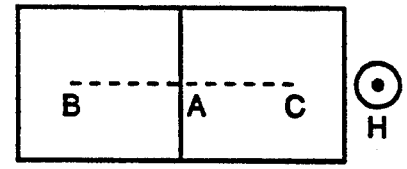

FIGS. 22-24 show embodiments of open architecture, three-reflection, unidirectional planar ring oscillators in which the ring light path involves propagation inside two physically separated solid-state elements and across the spacing between these two elements. The presence of these additional interfaces implies a stronger partial polarizer effect in the resonator. The possibilities for distributing the effects that produce the optical diode, the laser gain, and the frequency tunability have been adequately presented in connection with the analogous two-component, three-reflection, closed architecture, unidirectional planar ring oscillators of FIGS. 11-15. Alternative embodiments utilize more reflections in a round trip, multiple pumping ports, and the use of special materials and light paths as described in connection with FIGS. 16 and 17.

Figure 25A:
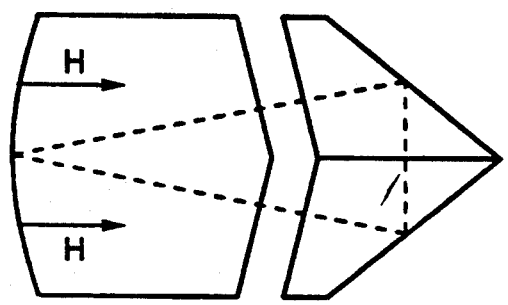
FIGS. 25(a)-25(c) show an open architecture, three-element composite planar ring oscillator in which the right light path internal to the resonator enters and exits all three solid-state elements at normal incidence.
Figure 25B:
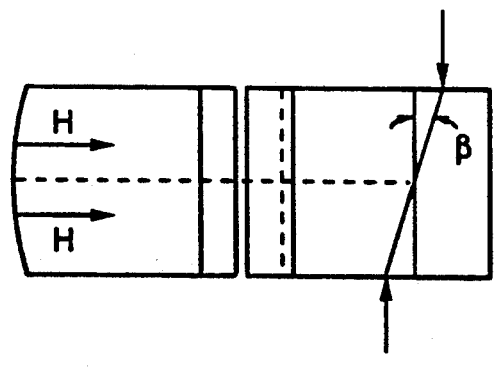
Figure 25C:
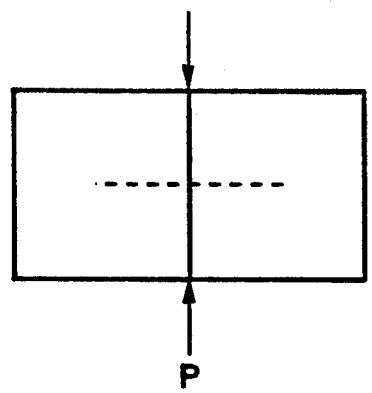

Alternative embodiments utilize different choices of interfaces. As a particular example, FIG. 25 shows an embodiment in which the ring light path is perpendicular to all of the interfaces.

4. Appendix A: Geometries of Light Paths

Figure 26A:
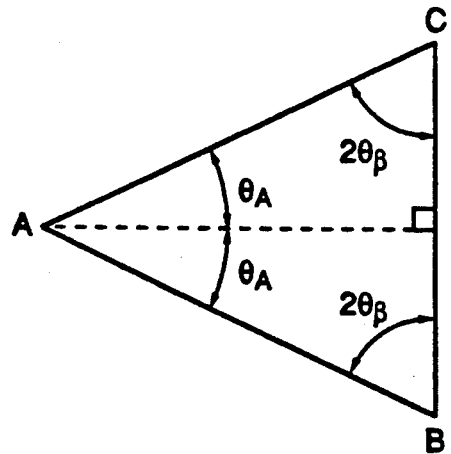
FIGS. 26(a)-26(c) show three-, four-, and five-reflection ring light paths that have a plane of mirror symmetry perpendicular to the plane of the ring light path.
Figure 26B:
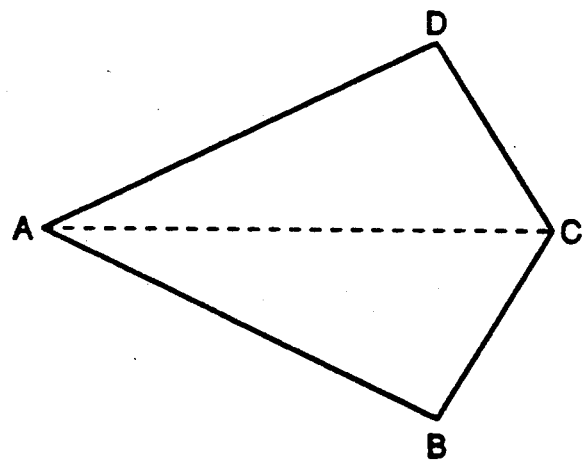
Figure 26C:
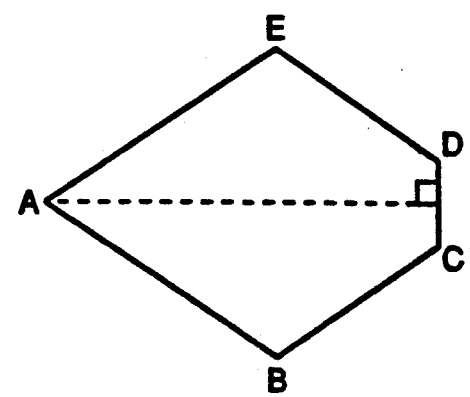

The light paths considered here are planar light paths having a plane of mirror symmetry perpendicular to the plane of the light path such that the plane of mirror symmetry intersects the light path along a line bisecting the apex angle at vertex A. The resonator producing the light path is also taken to be mirror symmetric as described above. This symmetry simplifies the analysis of the constraint conditions. For example, three-reflection light paths are necessarily isosceles or equilateral triangles. FIG. 26 shows examples of three-reflection, four-reflection, and five-reflection planar figures having such mirror symmetry. Note that, for light paths defined by an odd number of reflections, the leg opposite vertex A is perpendicular to the line bisecting the apex angle at A. For light paths defined by an even number of reflections, the bisector of apex angle A passes through another vertex.

The analysis presented here treats the case of optically isotropic media only. Generalization to optically anisotropic media is still under development.

4.1 Total Internal Reflection at B and C, no TIR at A

We require total internal reflection to occur at B and C, and we require that total internal reflection not occur at A, in order that the surface at A can serve as the output coupler for the resonator.

By symmetry, we can consider only vertices A and B. The angles of incidence at A and B must satisfy $$\theta_A < \theta_{critical}.$$

$$\theta_B > \theta_{critical}$$

where $\theta_{critical}$ is the critical angle for internal reflection in the medium with index of refraction n, $$\theta_{critical} = \sin^{-1}(1/n).$$

Additionally, the angles of incidence $\theta_A$ and $\theta_B$ must satisfy the trigonometric constraint $$\theta_A + 2\theta_B = 90.$$

Since the angle of incidence at B is constrained to exceed the critical angle, and since the angle of incidence at A must be less than the critical angle, there is an upper limit on the permissible angles of incidence at A:

$$\theta_z^{max} = \min\{\theta_{critical}, 90 - 2\theta_{critical}\}$$

For n<2.0, the upper limit on $\theta_A$ is

For n<2.0, the upper limit on $\theta_A$ is $$\theta_z^{max} = 90 - 2\theta_{critical},$$

corresponding to setting the angle of incidence at B to its smallest value, $$\theta_B^{min} = \theta_{critical}.$$

For n=2.0, the upper limit on $\theta_A$ is $\theta_A^{max} = \theta_{critical}$, and the corresponding minimal value of the angle of incidence at B is $$\theta_B^{min} = (90 - \theta_{critical})/2.$$

For symmetric ring light paths defined by more than three reflections, the analysis proceeds as above. In each case we find constraints on the permissible angles of incidence at the various vertices in order to assure that total internal reflection occurs at all vertices but A and that total internal reflection does not occur at A.

6.2 Multiport Pumping at A, B, and C: No TIRs

If instead we want to be able to pump the laser longitudinally through all of the reflection vertices, the constraints on the angles are changed. In this case we require that all of the angles of incidence be smaller than the critical angle for the medium. For the mirror-symmetric triangular case this constraint is $$\theta_A, \theta_B < \theta_{critical}.$$

Of course, the same trigonometric constraint exists, $$\theta_A + 2\theta_B = 90.$$

Together, these constraints result in upper and lower limits for the angles of incidence at A and B as follows. First, there is an index of refraction constraint, because there are no solutions at all for materials with index of refraction exceeding 2.0. For materials with index of refraction less than or equal to 2.0, the limits are:

$$\theta_A{}^{min} = 90 - 2\theta_{critical}$$

$$\theta_A{}^{max} = \theta_{critical}$$

$$\theta_B{}^{min} = (90 - 2\theta_{critical})/2$$

$$\theta_A{}^{max} = \theta_{critical}.$$

As a special case of the isosceles solutions for multiport pumping, we consider the equilateral light path. This light path can satisfy the constraints for multiport pumping for all indices of refraction less than 2.0. When the index of refraction is 2.0, the equilateral light path is the only solution. Therefore, a qualitative description of the available design space for angles of incidence at A and B is as follows. For indices of refraction less than 2.0, there are isosceles and equilateral light paths that satisfy all of the constraints. The range of admissible angles of incidence decreases as the solution is the equilateral light path. There are no solutions for $n > 2.0$.

The solutions for light paths with larger numbers of reflections in a round trip are worked out using the same constraint equations as above. A possible generalization is to mix the availability of total internal reflection and multiport pumping, which is potentially desirable in order to avoid the cost and complexity of applying too many different optical coatings to a monolithic laser component.

5 Appendix B: Eigenpolarization Analysis

The purpose of this Appendix is to provide a framework for analyzing the various embodiments described in the body of the text. The detailed mathematical formalism for performing such analyses is contained in Nilsson, Gustafson, and Byer. From that analysis we distill two crucial results. The first result pertains to finding the optical equivalent of a given ring light path. The second result pertains to synthesizing strong optical diodes.

5.1 Optical Equivalence Theorem

Figure 27A:
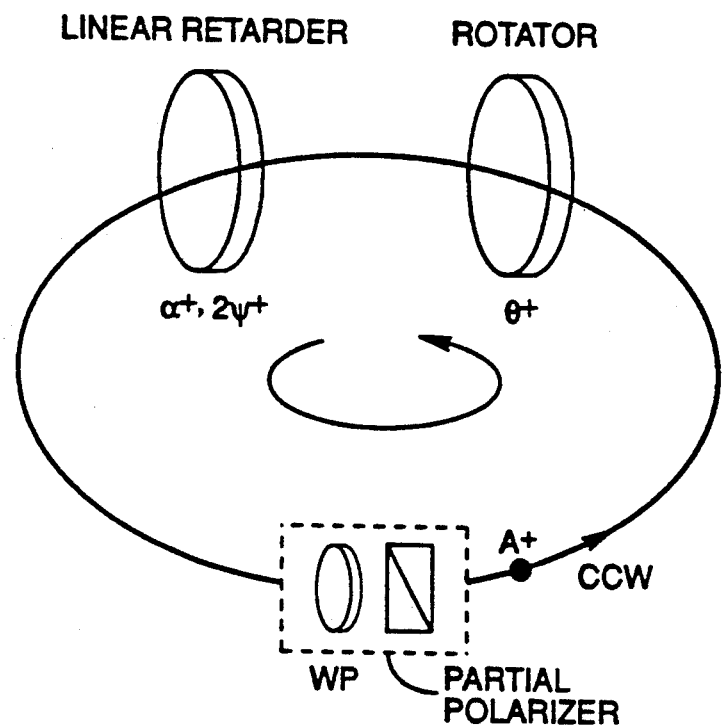
FIGS. 27(a) and 27(c) show general optical systems that are equivalent in their eigenpolarization characteristics to any planar ring oscillator in which the only amplitude anisotropy (partial polarizer behavior) occurs at reflection Vertex A.
Figure 27B:
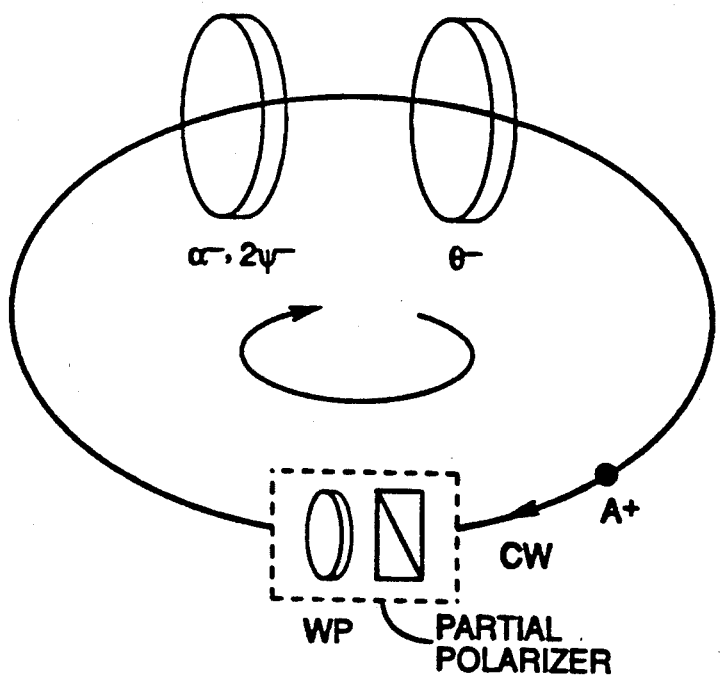

Hurwitz et al., "A new calculus for the treatment of optical systems, II. Proof of three general equivalence theorems," *J. Opt. Soc. Am.*, 31, 494–499, (1941) describes a theorem regarding the Jones matrices associated with propagation through lossless optical media. The optical interpretation of this theorem is the following: any system of optical elements comprising linear retarders and rotators is equivalent, with respect to polarization transformation properties, to a system containing just one rotator and one linear retarder. This theorem can be applied directly to many of the planar ring oscillator schemes described in the body of the text by considering the polarization-transforming properties of all of the elements of the ring path except for the output coupler. The output coupler is itself equivalent to a combination of a linear retarder and a partial polarizer, the principal axes of both elements being strictly aligned with one another. Application of the optical equivalence theorem to the monolithic planar ring oscillators leads, in every case in which all reflections other than the reflection from the output coupler at A are taken to be lossless, to the optical equivalent resonators shown in FIG. 27. With regard to establishing an optical diode, the important point is that in general the retardance and orientation angle of the equivalent linear retarder depends on the direction of pr-opagation, as does the rotation angle of the rotator. It is the difference in one or more of these parameters that causes the eigenpolarizations for the two directions of propagation to have different losses.

Figure 28A:
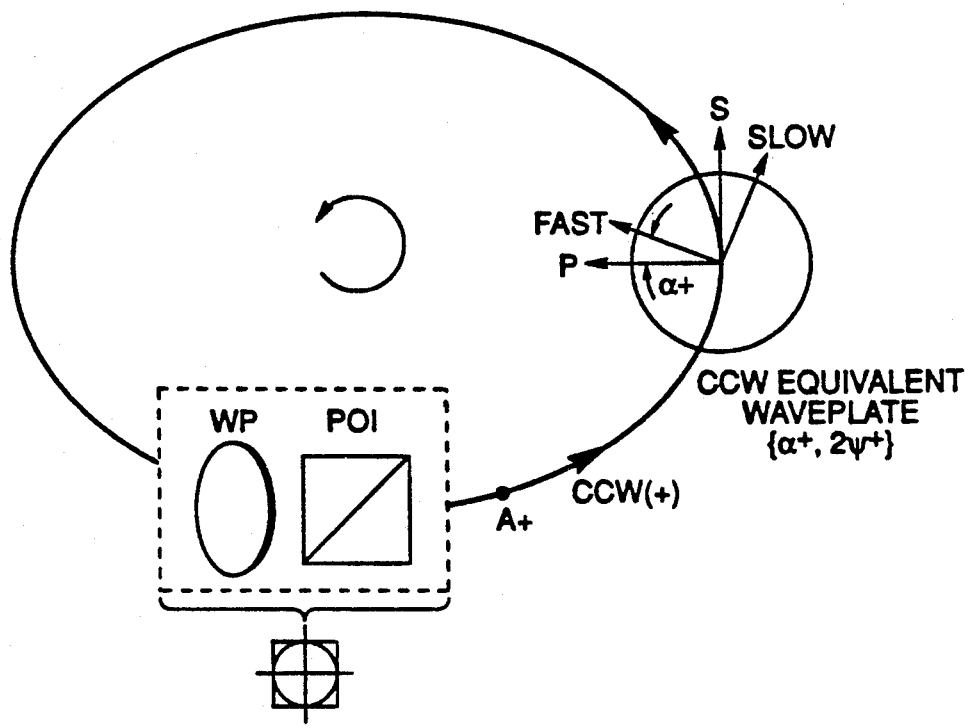
Figure 28B:
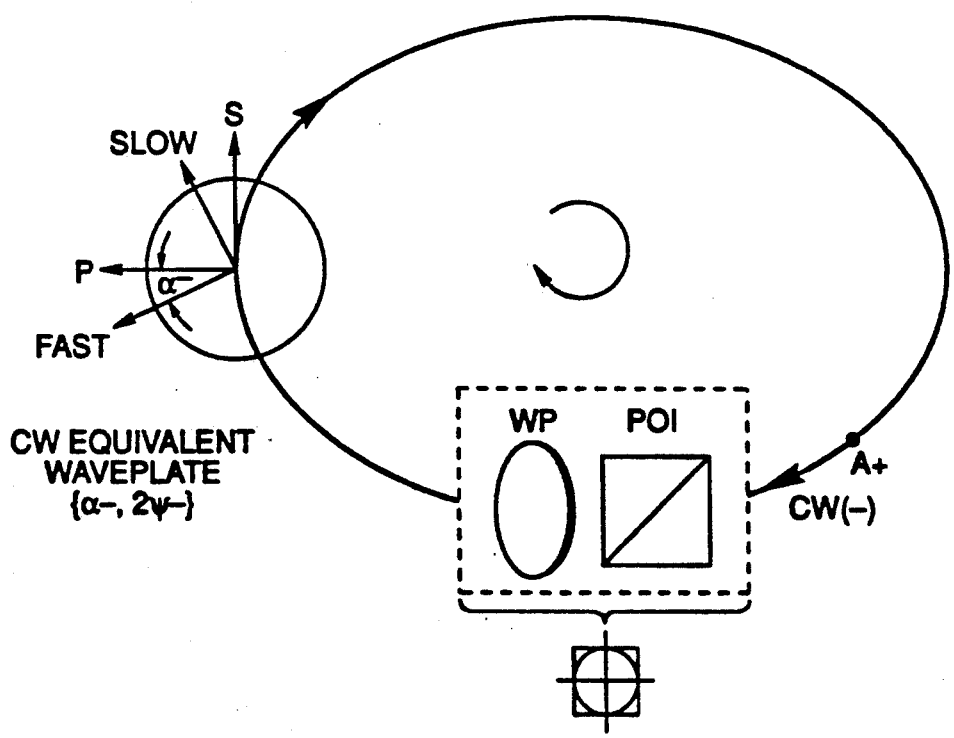

A special case deserves to be singled out. Under certain conditions to be described below, the optical equivalents of the resonators for the two directions of propagation simplifies to contain no additional rotator. In that case, the two optical equivalents are shown in FIG. 28. This special case has been analyzed by Nilsson, Gustafson, and Byer. Although the analysis performed there arose from consideration of symmetric light paths in monolithic nonplanar ring oscillators, the equations and their interpretation are completely identical for planar ring oscillators, as we now show.

Figure 29A:
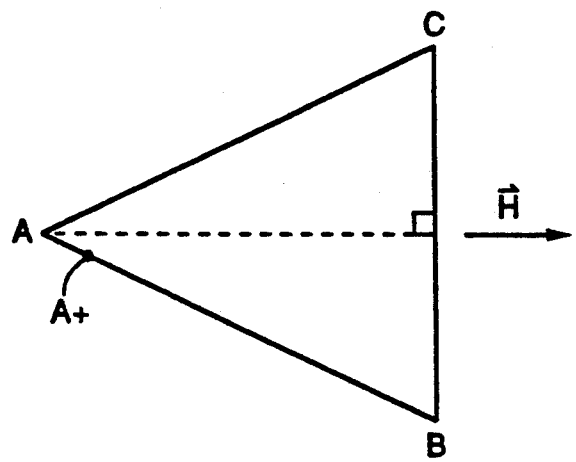
Figure 29B:
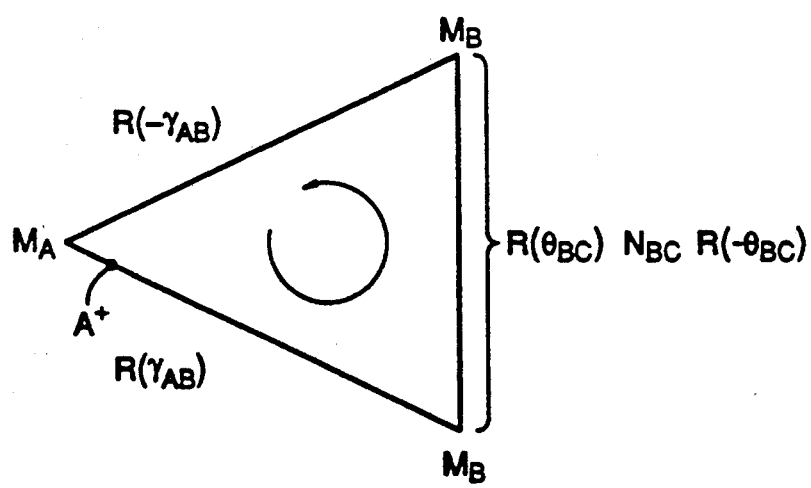

Consider the symmetric triangular light path of FIG. 29. Assume that a localized, rotated birefringence effect occurs on leg BC, and that only Faraday rotation occurs along legs AB and AC. For this case, the Jones matrices for the round trip through the resonator are $$M^+ = M_A R(\gamma_{AB}) M_B R(-\theta_{BC}) N_{BC} R(\theta_{BC}) M_B R(\gamma_{AB}),$$

$$M^- = R(-\gamma_{AB}) M_B R(\theta_{BC}) N_{BC} R(-\theta_{BC}) M_B R(\gamma_{AB}) M_A.$$

Here + and − denote the two directions of propagation around the ring, R denotes a rotation matrix, $M_B$ denotes a diagonal Jones matrix representing the linear retarder associated with reflection at B, $M_A$ denotes a diagonal Jones matrix representing the linear retarder associated with reflection at A, $N_{BC}$ denotes a diagonal Jones matrix representing the linear retarder associated with the birefringence between vertices B and C, $\gamma_{AB}$ denotes the Faraday rotation along leg AB, and $\theta_{BC}$ is the angle representing the rotation of the principal axes of the localized birefringence along leg BC with respect to the s and p basis vectors for propagation from B to C. The reason for explicitly giving this product is to enable direct comparison with Eqs. (21) and (22) of Nilsson, Gustafso which the round trip Jones matrices for propagation through a four-reflection monolithic nonplanar ring oscillator are given. It is seen that the forms of these equations are identical. Therefore, the optical equivalents and their interpretations are also identical. It is shown in Appendix C of Nilsson, Gustafson, and Byer that these round trip matrices yield optical equivalents that do not involve any additional rotators; hence the optical equivalents are as shown in FIG. 28. In particular, we can use the previously derived results of Nilsson, Gustafson, and Byer to describe the synthesis of an optimized optical diode.

An optical diode is defined to be a device that produces a propagation-direction-dependent difference in the losses of the eigenpolarizations of the resonator. With regard to establishing unidirectional oscillation in a ring laser, the minimal requirement on the optical diode is that the loss difference it induces exceed the coupling between the two directions of propagation due to effects such as scattering in the bulk medium and at interfaces. Optimal performance, however, imposes much more rigorous requirements on the optical diode. We define an optimized optical diode as a device with the following properties:

1) it induces unidirectional operation of the ring laser,
2) the eigenpolarization for the selected direction of propagation is the minimal loss eigenstate for the ring,
3) the differential loss between the oscillating and non-oscillating directions of propagation is as large as possible subject to constraint (2) above.

5.2 Synthesis of an Optimized Optical Diode

An algorithm for synthesizing an optimized optical diode for such a ring laser is the following. First, the equivalent linear retarder for the selected direction of propagation should have its principal axes aligned with those of the output coupler. This guarantees operation in the lowest loss eigenpolarization for the resonator, regardless of the retardance value. Second, the retardance of the equivalent retarder for the nonoscillating direction should be chosen such that the sum of the retardance of the output coupler and that of the equivalent retarder is 360 degrees. For the case in which the output coupler has a standard quarterwave dielectric stack mirror, characterized by a retardance of 180 degrees, this condition reduces to setting the retardance of the equivalent retarder of the nonoscillating direction equal to 180 degrees. Finally, in order to maximize the loss difference between the oscillating and nonoscillating directions, the parameters of the ring should be chosen such that the orientation angle of the principal axes of the nonoscillating direction's equivalent linear retarder is as large as possible. This algorithm has been used in the design of optimized optical diodes in monolithic nonplanar ring lasers as described in the U.S. patent applications of Nilsson et al. and by Rea, Jr. et al., cited previously.

It is a straightforward generalization of the above results to prove that any symmetric, planar ring light path with an odd number of reflections reduces to a system with optical equivalents as in FIG. 28. The importance of this observation is that achieving the required retardance sum for the ring can be difficult because of the existence of an index-of-refraction-determined maximum phase shift upon reflection from a total internal reflection surface. Consider the symmetric three-reflection ring, for example. The induced birefringence on the leg BC must be large enough that its retardance plus twice the retardance associated with reflection from vertex B is equal to 180 degrees, if optimized operation is to be achieved. As an example, in Nd:YAG with index of refraction 1.82 at 1064 nm, the maximum total internal reflection retardance is 64.85 degrees, occurring for an angle of incidence of 42.92 degrees. To produce an optimized optical diode, the induced retardance on leg BC would have to be $180-2(64.85)=50.30$ degrees. This is a large retardance, given the weakness of the photoelastic effect. For example, in YAG the typical order of magnitude of the induced birefringence in when a stress equal to the maximum tensile strength of YAG is applied is $\Delta n = 10^{-4}$. One can reduce the difficulty of the requirements on the induced birefringence by including, for example, two more total internal reflections to give additional total internal reflection retardance. An analogous scheme has been applied by Rea, Jr. et al. to establish optimized optical diodes in monolithic nonplanar ring oscillators made from low-index materials such as Nd:glass.

To summarize, the analysis of monolithic planar ring oscillators can be reduced to the treatment of simplified, optically equivalent resonators. In the most general case described here, the optical equivalents involve a linear retarder with its principal axes rotated with respect to those of the output coupler, and an additional rotator. In special preferred cases, the additional rotator does not appear in the equivalent resonators. Optical diodes sufficiently strong to induce unidirectional oscillation are possible in either case, and are even possible in the most general example described in connection with FIG. 1. An algorithm for producing optimized optical diodes has been given for the preferred case in which no additional rotators appear in the optically equivalent resonators, and systems for which such optical equivalents exist have been identified.

All publications and patent applications cited in this specification are herein incorporated by reference as if each individual publication or patent application were specifically and individually indicated to be incorporated by reference.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appending claims.

What is claimed is:

1. A non-monolithic laser resonator comprising:
   at least a first piece and a second piece, at least one of said pieces comprising a solid-state laser gain medium, and at least one of said pieces comprising a magneto optic material;
   input means for receiving input energy to pump said laser;
   means for defining a unidirectional planar ring light path within a region defined by said pieces and any gaps located therebetween, in which laser oscillation occurs in response to said input energy, said ring comprising:

means for providing within at least one of said pieces a partial polarizer effect;

means for providing within at least one of said pieces a nonreciprocal polarization transformation; and means for providing, within at least one of said pieces a reciprocal polarization transformation caused by birefringence; and output means for extracting an output laser beam from said laser oscillation occurring in said ring.

2. A laser resonator as in claim 1 wherein said birefringence comprises linear birefringence, and said at least one of said pieces which provides said birefringence has principal axis which are oriented so as to not be parallel and perpendicular to the plane of propagation of the light in said ring.

3. A laser resonator as in claim 2 wherein said first and second pieces are arranged such that said linear birefringence and said nonreciprocal polarization transformation are made to both occur on at least one leg of said planar ring light path.

4. A laser resonator as in claim 2 wherein said linear birefringence is localized to apply to a single leg of said planar ring light path, such that said nonreciprocal polarization transformation does not simultaneously occur on said single leg.

5. A laser resonator as in claim 2 wherein said nonreciprocal polarization transformation is at least partially caused by magneto-optic rotation of polarization occurring within said solid-state laser gain medium on one or more of the legs of said planar ring light path, said magneto-optic rotation occurring only in the presence of an externally applied magnetic field.

6. A laser resonator as in claim 2 wherein said one of said first and second pieces which provides said linear birefringence effect comprises a birefringent crystal.

7. A laser resonator as in claim 6 wherein said linear birefringence effect comprises modification of said inherent linear birefringence by additional induced birefringence on at least one of said pieces owing to the action of an effect selected from the group consisting of an externally applied stress via the photoelastic effect and an electric field via the electro-optic effect.

8. A laser resonator as in claim 1 wherein at least one of said pieces is a material selected from the group consisting of an amorphous glass and a crystal with cubic point group symmetry, such that said birefringence is wholly induced therein by a stimulus which is selected from the group consisting of an externally applied stress and an electric field.

9. A laser resonator as in claim 1 wherein at least two pieces are joined without gaps therebetween, such that said ring light path is entirely contained within said pieces.

10. A laser resonator as in claim 9 wherein the interface between at least two of said pieces comprises at least one planar facet associated with each of said at least two pieces, the normals to which lie on the line of intersection of the plane of the light path and the perpendicular plane of mirror symmetry of said light path.

11. A laser resonator as in claim 9 wherein the interface between at least two of said pieces comprises one or more planar facets associated with each of said at least two pieces, such that said ring light path comprises angles on said facets, said angle of incidence being Brewster's angle.

12. A laser resonator as in claim 9 wherein the interface between at least two of said pieces comprises a plurality of planar facets associated with each piece, such that the planar ring light path is perpendicular to said planar facets.

13. A laser resonator as in claim 9 wherein said at least two pieces are located with respect to each other such that at least one gap exists therebetween, such that said planar ring light path passes through at least one gap.

14. A laser resonator as in claim 13 further comprising means for adjusting the width of said gaps in said ring light path such that the frequency of said laser resonator is tuned.

15. A laser resonator as in claim 14 wherein one of said pieces comprises a mirror which serves as an input coupler, an output coupler, or both.

16. A unidirectional planar ring oscillator as in claim 1 which comprises:

a first piece formed as a first cylindrical rod having a first end shaped as a spherical surface having a center of curvature lying on the axis of said first cylindrical rod, and having a second end shaped as a planar surface perpendicular to said axis of said first cylindrical rod, said spherical surface serving as said input means and as said output means and further serving as a partial polarizer means;

a second piece formed as a second cylindrical rod having a first end shaped as a planar surface perpendicular to the axis of said second cylindrical rod and a second end including two planar facets, wherein said planar surface of said second cylindrical rod has a plane of mirror symmetry containing the line of intersection of said two planar facets and the longitudinal axis of said second cylindrical rod;

means for joining said planar surface of said first piece and said planar surface of said second piece such that said axes of said first and second cylindrical rods are approximately collinear, and such that transmission of laser radiation between said first piece and said second piece is substantially 100% for linear polarization in the plane of incidence or for linear polarization perpendicular to the plane of incidence; and means for applying a stimulus selected from the group consisting of stress and an electric field, substantially perpendicular to the longitudinal axis of at least one of said first and second cylindrical rods such that the resulting induced linear birefringence has principal axes that are not parallel and perpendicular to the plane of said ring light path, wherein said planar ring light path is defined by three internal reflections in a round trip, one reflection occurring at said spherical end of said first piece, and one reflection occurring at each of said planar facets of said second end of said second piece.

17. A unidirectional planar ring oscillator as in claim 1 which comprises:

a first piece formed as a first cylindrical rod having a first end shaped as a spherical surface having a center of curvature lying on the axis of said first cylindrical rod, and having a second end shaped as a planar surface perpendicular to said axis of said first cylindrical rod, said spherical surface serving as said input means and as said output means and further serving as a partial polarizer means;

a second piece formed as a second cylindrical rod having a first end shaped as a planar surface perpendicular to the axis of said second cylindrical rod, and a second end shaped as a spherical surface;

means for joining said planar surface of said first piece and said planar surface second piece such that said axes of said first and second cylindrical rods are approximately collinear, and such that transmission of laser radiation between said first and second pieces is substantially 100% for linear polarization in the plane of incidence or for linear polarization perpendicular to the plane of incidence; and means for applying a stimulus selected from the group consisting of stress and an electric field, substantially perpendicular to the longitudinal axis of at least one of said first and second cylindrical rods such that the resulting induced linear birefringence has principal axes that are not parallel and perpendicular to the plane of the ring light path, wherein said planar ring light path is defined by three internal reflections in a round trip, one reflection occurring at said spherical end of said first piece, and two reflections occurring at said spherical surface of said second end of said second piece.

18. A unidirectional planar ring oscillator as in claim 1 which comprises:
a first piece having:
  a planar top surface;
  a planar bottom surface parallel to said top surface;
  a planar first side surface perpendicular to said top and bottom surfaces;
  a planar second side surface parallel to said first side surface;
  a planar back surface perpendicular to said top surface, bottom surface, first side surface, and second side surface; and
  a convex spherically curved front surface whose center of curvature lies on the line of intersection of the two planes of mirror symmetry that bisect said side surfaces and said top and bottom surfaces, respectively, said convex front surface serving as said input means, said output means, and further serving as a partial polarizer means;
a second piece having:
  a planar top surface shaped like a pentagon with two parallel sides, said pentagon having a plane of mirror symmetry that intersects the plane of said pentagon on a line parallel to said two parallel sides;
  a planar bottom surface parallel to said planar top surface and having the same shape as said top surface;
  a first planar end surface perpendicular to said top and bottom surfaces and joining the ends of said pentagons that are bisected by said plane of mirror symmetry;
  a first side surface perpendicular to said top and bottom surfaces and said planar end surface;
  a second side surface perpendicular to said top, bottom, and first end surfaces, and parallel to said first side surface; and
  a pair of planar facet surfaces, the planes of which are perpendicular to said top and bottom surfaces;
means for joining said planar back surface of said first piece and said first planar end surface of said second piece such that the resulting composite resonator has a plane of mirror symmetry that contains the line of intersection of said first and second facets of said second piece, and such that transmission of laser radiation between said first and second piece is substantially 100% for linear polarization in the plane of incidence or for linear polarization perpendicular to the plane of incidence; and means for applying a stimulus selected from the group consisting of stress and an electric field, substantially localized to the leg of the ring light path joining the points of intersection of the ring light path with said planar facet surfaces of said second piece, such that the principal axes of the resulting localized birefringence are not parallel and perpendicular to the plane of the ring light path, wherein said planar ring light path is defined by three internal reflections in a round trip, one reflection occurring at said spherical end of said first piece, and one reflection occurring at each of said planar facet surfaces of said second piece.

19. A unidirectional planar ring oscillator as in claim 1 which comprises:
a first piece comprising a laser mirror having a first face and a second face, said first face serving as said input means and as said output means and as a partial polarizer, said second face serving to transmit both input pump radiation and generated ring laser radiation;
a second piece formed as a cylindrical rod of a laser gain medium that is also capable of magneto-optic polarization transformation, said cylindrical rod having a first end shaped as a planar surface perpendicular to the axis of said cylindrical rod, and a second end including two planar facets, wherein said cylindrical rod has a plane of mirror symmetry containing the line of intersection of said two planar facets and said axis of said cylindrical rod, said first end of said second piece serving to transmit substantially all of the generated ring laser radiation polarized either parallel or perpendicular to the plane of incidence on said first end of said second piece;
a gap separating said laser mirror and second pieces;
means for adjusting said gap by translation means capable of moving either said laser mirror with respect to said second piece or said second piece with respect to said laser mirror; and
means for applying a stimulus selected from the group consisting of stress and an electric field, substantially perpendicular to said axis of said cylindrical rod such that the resulting induced linear birefringence has principal axes that are not parallel and perpendicular to the plane of said ring light path, wherein said planar ring light path is defined by three reflections in a round trip, one reflection occurring at said first face of said laser mirror, and one reflection occurring at each of said planar facets of said second end of said second piece.

20. A unidirectional planar ring oscillator claim 1 which comprises:
a first piece comprising a laser mirror having a first face and a second face, said first face serving as said input means and as said output means and further serving as a partial polarizer, said second face serving to transmit both pump radiation and generated ring laser radiation;
a second piece formed as a cylindrical rod of a magneto-optic laser gain medium which provides said nonreciprocal polarization transformation, said cylindrical rod having a first end shaped as a planar surface perpendicular to the axis of said cylindrical rod, and a second end shaped as a spherical surface, said first end of said second piece serving to transmit substantially all of the generated ring laser radiation polarized either parallel or perpendicular to the plane of incidence on said first end of said second piece;

a gap separating said laser mirror and said second piece;

means for adjusting said gap by moving either said laser mirror with respect to said second piece or said second piece with respect to said laser mirror;

means for applying a stimulus selected from the group consisting of stress and an electric field, substantially perpendicular to said axis of said second piece such that the resulting induced linear birefringence has principal axes that are not parallel and perpendicular to the plane of the ring light path, wherein said planar ring light path is defined by three reflections in a round trip, one reflection occurring at said first surface of said laser mirror, and two reflections occurring at said spherical second end of said second piece.

21. A unidirectional planar ring oscillator as in claim 1 which comprises:

a first piece comprising a laser mirror having a first face and a second face, said first face serving as said input means and as said output means and further serving as a partial polarizer, said second face serving to transmit both pump radiation and generated ring laser radiation;

a second piece comprising a magneto-optic laser gain medium which provides said nonreciprocal polarization transformation, said second piece having:
   a planar top surface shaped like a pentagon with two parallel sides, said pentagon having a plane of mirror symmetry that intersects the plane of said pentagon on a line parallel to said two parallel sides;
   a planar bottom surface parallel to said planar top surface and having the same shape as said top surface;
   a first planar end surface perpendicular to said top and bottom surfaces and joining the ends of said pentagons that are bisected by said plane of mirror symmetry;
   a first side surface perpendicular to said top and bottom surfaces and said planar end surface;
   a second side surface perpendicular to said top, bottom, and first end surfaces, and parallel to said first side surface; and
   a pair of planar facet surfaces, the planes of which are perpendicular to said top and bottom surfaces, said first end of said second piece serving to transmit substantially all of the generated ring laser radiation polarized either parallel or perpendicular to the plane of incidence on said first end of said second piece;

a gap separating said laser mirror and second piece;

means for adjusting said gap by moving either said laser mirror with respect to said second piece or said second piece with respect to said laser mirror; and means for applying a stimulus selected from the group consisting of stress and an electric field, substantially localized to the leg of the ring light path joining the points of intersection of the ring light path with said planar facet surfaces of said second piece, such that the principal axes of the resulting localized birefringence are not parallel and perpendicular to the plane of the ring light path, wherein said planar ring light path is defined by three internal reflections in a round trip, one reflection occurring at said spherical end of said first piece, and one reflection occurring at each of said planar facet surfaces of said second piece.

22. A laser resonator as in claim 1 wherein said first piece comprises a laser gain medium and said second piece comprises birefringent magneto-optic a material.

23. A unidirectional planar ring oscillator as in claim 1 which comprises:

a first piece formed as a first cylindrical rod having a first end shaped as a spherical surface having a center of curvature lying on the axis of said cylindrical rod and having a second end shaped as a planar surface perpendicular to said axis of said cylindrical rod, said spherical surface serving as said input means and as said output means and further serving as a partial polarizer means, said planar surface of said first piece serving to transmit substantially 100% of generated laser radiation polarized parallel to the plane of incidence or to transmit substantially 100% of generated laser radiation polarized perpendicular to the plane of incidence;

a second piece shaped as a second cylindrical rod having a first end shaped as a planar surface perpendicular to the axis of said second cylindrical rod, and having a second end including two planar facets, wherein said second cylindrical rod has a plane of mirror symmetry containing the line of intersection of said two planar facets and said axis of said second cylindrical rod, said first end of said second piece serving to transmit substantially all of the generated ring laser radiation polarized either parallel or perpendicular to the plane of incidence on said first end of said second piece;

a gap separating said first and second pieces;

means for adjusting said gap by moving either said first piece with respect to said second piece or said second piece with respect to said means for applying stress or an electric field substantially perpendicular to the longitudinal axis of at least one of said first and second pieces such that the resulting induced linear birefringence has principal axes that are not parallel and perpendicular to the plane of the ring light path, wherein said planar ring light path is defined by three reflections in a round trip, one reflection occurring at said spherical surface of said first piece, and one reflection occurring at each of said planar facets of said second end of said second piece.

24. A unidirectional planar ring oscillator as in claim 1 which comprises:

a first piece shaped as a first cylindrical rod having a first end shaped as a spherical surface having a center of curvature lying on the axis of said first cylindrical rod, and having a second end shaped as a planar surface perpendicular to said axis of said first cylindrical rod, said spherical surface serving as said input means and as said output means and further serving as a partial polarizer means, said planar surface of said first piece serving to transmit substantially all of generated laser radiation polarized parallel to the plane of incidence or to transmit substantially all of generated laser radiation polarized perpendicular to the plane of incidence;

a second piece shaped as a second cylindrical rod having a first end shaped as a planar surface perpendicular to the axis of said second cylindrical rod, and having a second end shaped as a spherical surface, said planar first end of said second piece serving to transmit substantially all of the generated ring laser radiation polarized either parallel or perpendicular to the plane of incidence on said first end of said second piece;

a gap separating said first and second pieces;

means for adjusting said gap by moving either said first piece with respect to said second piece or said second piece with respect to said first piece; and means for applying a stimulus selected from the group consisting of stress and an electric field, substantially perpendicular to the longitudinal axis o at least one of said first and second pieces such that the resulting induced linear birefringence has principal axes that are not parallel and perpendicular to the plane of the ring light path, wherein said planar ring light path is defined by three reflections in a round trip, one reflection occurring at said first end of said first piece and two reflections occurring at said spherical second end of said second piece.

25. A unidirectional planar ring oscillator as in claim 1 which comprises:

a first piece shaped as a cylindrical rod having a first end shaped as a spherical surface having a center of curvature lying on the axis of said cylindrical rod, and having a second end shaped as a planar surface perpendicular to said axis of said cylindrical rod, said spherical surface serving as said input means and as said output means and further serving as a partial polarizer means, said planar surface perpendicular of said first piece serving either to transmit substantially 100% all of generated laser radiation polarized parallel to the plane of incidence or to transmit substantially all of generated laser radiation polarized perpendicular to the plane of incidence;

a second piece having:

a planar top surface shaped like a pentagon with two parallel sides, said pentagon having a plane of mirror symmetry that intersects the plane of said pentagon on a line parallel to said two parallel sides;

a planar bottom surface parallel to said planar top surface and having the same shape as said top surface;

a first planar end surface perpendicular to said top and bottom surfaces and joining the ends of said pentagons that are bisected by the plane of mirror symmetry;

a first side surface perpendicular to said top and bottom surfaces and said planar end surface;

a second side surface perpendicular to said top, bottom, and first end surfaces, and parallel to said first side surface; and a pair of planar facet surfaces, the planes of which are perpendicular to said top and bottom surfaces, said first end of said second piece serving to transmit substantially all of the generated ring laser radiation polarized either parallel or perpendicular to the plane of incidence on said first end of said second piece;

a gap separating said first and second pieces; and means for adjusting said gap by moving either said first piece with respect to said second piece or said second piece with respect to said first piece;

means for applying a stimulus selected from the group consisting of stress and an electric field, substantially localized to the leg of the ring light path joining the points of intersection of the ring light path with said planar facet surfaces of said second piece, such that the principal axes of the resulting localized birefringence are not parallel and perpendicular to the plane of the ring light path, wherein said planar ring light path is defined by three internal reflections in a round trip, one reflection occurring at said spherical end of said first piece, and one reflection occurring at each of said planar facet surfaces of said second piece.

26. A non-monolithic laser resonator having eigenpolarization states, comprising:

at least a first piece and a second piece, at least one of said pieces comprising a solid-state laser gain medium, and at least one of said pieces comprising a magneto optic material;

input means for receiving input energy to pump said laser resonator;

means for defining a ring light path involving three or more reflections, in which laser oscillation occurs in response to said input energy;

means for extracting an output laser beam from said laser oscillation;

means for inducing unidirectional oscillation within said ring light path; and means for tuning the eigenpolarization states of said laser resonator, said means for tuning comprising a tunable birefringence effect within said solid-state laser material.

27. A laser resonator as in claim 26 wherein said means for defining a ring light path comprises means for defining a non-planar ring light path.

28. A laser resonator as in claim 26 wherein said birefringence effect comprises linear birefringence.

29. A laser resonator as in claim 26 wherein said means for defining a ring light path comprises means for defining a planar ring light path.

30. A laser resonator as in claim 29 wherein said means for tuning the eigenpolarization states of said non-monolithic laser resonator comprises:

a reciprocal polarization transformation resulting from orienting the plane of said planar ring light path such that the principal axes of said linear birefringence effect are not parallel and perpendicular to said planar ring light path;

a nonreciprocal polarization transformation caused by magneto-optic rotation of polarization occurring within said solid-state laser material on one or more of the legs of said planar ring light path, said magneto-optic rotation occurring only in the presence of an externally applied magnetic field; and a partial polarizer effect caused by oblique reflection from one or more reflection facets formed on said piece of solid-state laser medium, the angle of incidence on said reflection facets being less than the critical angle of incidence for total internal reflection within said solid-state laser medium.

* * * * *